United States Patent
Moon et al.

(10) Patent No.: US 9,939,828 B2
(45) Date of Patent: Apr. 10, 2018

(54) DC-DC CONVERTING CIRCUIT AND A POWER MANAGEMENT CHIP PACKAGE INCLUDING THE SAME

(71) Applicant: SAMSUNG ELECTRONICS CO., LTD., Suwon-si, Gyeonggi-Do (KR)

(72) Inventors: Sungwoo Moon, Gyeonggi-do (KR); Myeonglyong Ko, Seoul (KR); Dongjin Keum, Gyeonggi-do (KR); Kyunggoo Moh, Gyeonggi-do (KR); Pyungwoo Yeon, Seoul (KR); Youso Cheon, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 254 days.

(21) Appl. No.: 14/800,176

(22) Filed: Jul. 15, 2015

(65) Prior Publication Data
US 2016/0033982 A1   Feb. 4, 2016

(30) Foreign Application Priority Data
Jul. 29, 2014 (KR) .................. 10-2014-0096656

(51) Int. Cl.
G05F 1/56 (2006.01)
(52) U.S. Cl.
CPC ...................... *G05F 1/56* (2013.01)
(58) Field of Classification Search
CPC .......... H02J 7/0052; H02J 7/022; H02J 7/045; H02J 7/008; H02J 7/0055; H02J 7/0068;
(Continued)

(56) References Cited

U.S. PATENT DOCUMENTS

| 5,723,970 A * | 3/1998 | Bell ................. | H01M 10/46 320/140 |
| 7,262,587 B2 * | 8/2007 | Takimoto .............. | H02M 1/36 323/222 |

(Continued)

FOREIGN PATENT DOCUMENTS

KR  1020140031783   3/2014

OTHER PUBLICATIONS

Texas Instruments, "High-Efficiency Qi v1.1-Compliant Wireless Power Receiver and Battery Charger", SLUSB42D—Jul. 2012-Revised Jan. 2014, p. 1-35.

(Continued)

*Primary Examiner* — Henry Lee, III
(74) *Attorney, Agent, or Firm* — F. Chau & Associates, LLC

(57) ABSTRACT

A direct current (DC)-DC converting circuit includes a voltage converter generating a regulation current in response to a driving signal and generating an output voltage and an output current; an output voltage regulator regulating the output voltage and outputting a first control signal; a voltage limiter limiting a voltage value of the first control signal below a threshold value; a current sensor sensing an intensity of the regulation current and generating a second control signal having a voltage value corresponding to a value of the sensed intensity; and a driving signal generator generating the driving signal based on the first and second control signals, the first control signal having the voltage value below the threshold value.

20 Claims, 22 Drawing Sheets

(58) Field of Classification Search
CPC ........ H02J 7/007; H02J 7/0072; H02J 7/0077; H02J 7/0086; H02J 7/04; G05F 1/56; G05F 1/575; H02M 2001/0025; H02M 3/156

See application file for complete search history.

(56) References Cited

U.S. PATENT DOCUMENTS

| | | | | |
|---|---|---|---|---|
| 8,044,648 | B1* | 10/2011 | Kahn | H02M 3/156 323/282 |
| 8,305,065 | B2* | 11/2012 | Sase | H02M 3/156 323/283 |
| 8,390,249 | B2 | 3/2013 | Walley et al. | |
| 8,624,573 | B2* | 1/2014 | Yu | H02M 3/158 323/285 |
| 8,928,294 | B2* | 1/2015 | Yamada | G05F 1/10 323/222 |
| 2003/0222629 | A1* | 12/2003 | Inoue | H02M 3/1588 323/224 |
| 2004/0207375 | A1* | 10/2004 | Umemoto | H02M 3/156 323/282 |
| 2005/0134220 | A1* | 6/2005 | Brohlin | H02J 7/0052 320/128 |
| 2012/0169137 | A1 | 7/2012 | Lisi et al. | |
| 2012/0235630 | A1* | 9/2012 | Qiu | H02J 7/022 320/107 |
| 2012/0268063 | A1* | 10/2012 | Qiu | H02J 7/022 320/107 |
| 2013/0021009 | A1* | 1/2013 | Waltman | H02M 3/156 323/271 |
| 2013/0026981 | A1 | 1/2013 | Van Der Lee | |
| 2013/0099733 | A1 | 4/2013 | Park et al. | |
| 2013/0119928 | A1 | 5/2013 | Partovi | |
| 2013/0154560 | A1 | 6/2013 | Walley et al. | |
| 2013/0162230 | A1* | 6/2013 | Miyamae | G05F 1/46 323/271 |
| 2013/0181539 | A1 | 7/2013 | Muratov et al. | |
| 2013/0229145 | A1 | 9/2013 | Alessandro et al. | |
| 2013/0257359 | A1 | 10/2013 | Sakai et al. | |
| 2013/0265002 | A1 | 10/2013 | Sakai | |
| 2013/0313904 | A1 | 11/2013 | Kayama | |
| 2014/0015331 | A1 | 1/2014 | Kim et al. | |
| 2014/0266119 | A1* | 9/2014 | Burton | H02M 3/157 323/283 |
| 2016/0344233 | A1* | 11/2016 | Paatero | H02M 7/219 |

OTHER PUBLICATIONS

Maxim Integrated, "Application Note 3939; DC-DC Controllers Use Average-Current-Mode Control for Infotainment Applications", Nov. 22, 2006, p. 1-9.

Linear Technology, "20V, 2.5A Synchronous Monolithic Step-Down Regulator with Current and Temperature Monitoring", p. 1-28.

* cited by examiner

DC-DC CONVERTING CIRCUIT AND A POWER MANAGEMENT CHIP PACKAGE INCLUDING THE SAME

CROSS-REFERENCE TO RELATED APPLICATION

The present application claims priority under 35 U.S.C. § 119 to Korean Patent Application No. 10-2014-0096656 filed on Jul. 29, 2014, in the Korean Intellectual Property Office, the disclosure of which is incorporated by reference herein in its entirety.

TECHNICAL FIELD

The present inventive concept relates to converting an electric signal, and more particularly, to a circuit for converting a direct current (DC) signal into a DC signal and a power management chip package including the same.

DESCRIPTION OF THE RELATED ART

An electric circuit functions by an electric signal. The electric signal may have a variety of forms (e.g., alternating current (AC) or direct current (DC)) and a variety of characteristics (e.g., a voltage or current). Some electric circuits may convert a form or a characteristic of an electric signal. For example, some electric circuits may convert an electric signal from an AC form to a DC form. Some electric circuits may convert a voltage characteristic of an electric signal to a current characteristic.

In particular, a switching regulator or a linear regulator may be used as a DC-DC converting circuit that converts an electric signal of a DC form into an electric signal of a DC form. The DC-DC converting circuit, for example, may convert a voltage of an inputted electric signal of a DC form from one voltage level into another.

A small electronic device (e.g., a handheld telephone, a tablet, and so on) may include multiple DC-DC converting circuits. However, functions of some these DC-DC converting circuits may be overlapped with one another. For example, a handheld telephone may include both of a DC-DC converting circuit for converting a high voltage from 5.5 V to 25 V into a low voltage of about 5 V and a DC-DC converting circuit for converting a voltage of about 5 V into a voltage of about 4.2 V. In this example, the conversion characteristics of the DC-DC converting circuits are different from one another but their functions are similar.

SUMMARY

An exemplary embodiment of the present inventive concept may provide a direct current (DC)-DC converting circuit comprising a voltage converter configured to receive an input voltage, to generate a regulation current in response to a driving signal, and to generate an output voltage and an output current, the output current being generated based on the regulation current; an output voltage regulator configured to regulate the output voltage, and to output a first control signal through a control output terminal; a voltage limiter configured to limit a voltage value of the first control signal below a threshold value; a current sensor configured to sense an intensity of the regulation current, and to generate a second control signal having a voltage value corresponding to a value of the sensed intensity; and a driving signal generator configured to generate the driving signal based on the first and second control signals, the first control signal having the voltage value below the threshold value.

When a voltage value of the output voltage is equal to a voltage value regulated by the output voltage regulator or greater than a minimum critical value, the voltage value of the first control signal is equal to a voltage of the control output terminal, and when the voltage value of the output voltage is below the voltage value regulated by the output voltage regulator and smaller than the minimum critical value, the voltage limiter is configured to limit the voltage value of the first control signal below the threshold value.

The output voltage and the output current respectively correspond to a charging voltage and a charging current which are used to charge a battery that is not fully charged.

When the battery that is not fully charged is connected to a node configured to output the output voltage, the voltage limiter is configured to limit the voltage value of the first control signal below the threshold value.

The voltage limiter comprises: an operational amplifier comprising a first input terminal configured to receive a limiting reference voltage, a second input terminal configured to receive a voltage of the control output terminal, and a comparison output terminal configured to output a result of comparing the limiting reference voltage and the voltage of the control output terminal; and a diode, an anode of the diode being connected to the second input terminal, and a cathode of the diode being connected to the comparison output terminal.

A voltage value of the limiting reference voltage is adjustable.

When a voltage value of a voltage of the control output terminal is equal to or smaller than a voltage value of a limiting reference voltage, the voltage value of the first control signal is equal to the voltage of the control output terminal, and when the voltage value of the voltage of the control output terminal is greater than the voltage value of the limiting reference voltage, the voltage limiter is configured to limit the voltage value of the first control signal below the threshold value.

An exemplary embodiment of the present inventive concept may provide a DC-DC converting circuit comprising a voltage converter configured to receive an input voltage, to generate a regulation current in response to a driving signal, and to output an output voltage and an output current, the regulation current comprising first current components of first intervals where a current value increases and second current components of second intervals where a current value decreases, the output current being generated based on the regulation current; an output voltage regulator configured to regulate the output voltage, and to generate a first control signal; a voltage limiter configured to limit a voltage value of the first control signal below a threshold value; a current sensor configured to sense an intensity of the regulation current, and to generate a second control signal having a voltage value corresponding to a value of the sensed intensity; an input current estimator configured to estimate an intensity of an input current by using the first current components of the first intervals, the input current being generated based on the input voltage; and a driving signal generator configured to generate the driving signal based on the first and second control signals, the first control signal having the voltage value below the threshold value.

The voltage converter comprises: a first transistor comprising a first terminal connected to a node configured to receive the input voltage, the first transistor being configured to be controlled by a first driving signal included in the driving signal; a second transistor connected between a second terminal of the first transistor and a ground node, and configured to be controlled by a second driving signal included in the driving signal; an inductive element, a first terminal of the inductive element being connected to the second terminal of the first transistor; and a capacitive element connected between a node configured to output the output voltage and the ground node.

The first transistor and the second transistor are turned on in turn, in response to the first driving signal and the second driving signal, respectively.

The regulation current is a current flowing through the inductive element.

A voltage value of a regulation reference voltage used to regulate the output voltage is adjustable.

An exemplary embodiment of the present inventive concept may provide a power management chip package comprising a rectifying circuit configured to rectify an alternating current (AC) voltage to generate a rectified voltage; a DC-DC converting circuit configured to receive the rectified voltage and to output an output voltage and an output current; and a control circuit configured to control operations of the rectifying circuit and the DC-DC converting circuit. The DC-DC converting circuit may comprise a voltage converter configured to receive the rectified voltage, to generate a regulation current in response to a driving signal, and to generate the output voltage and the output current, the output current being generated based on the regulation current; an output voltage regulator configured to regulate the output voltage, and to output a first control signal through a control output terminal; a voltage limiter configured to limit a voltage value of the first control signal below a threshold value; a current sensor configured to sense an intensity of the regulation current, and to generate a second control signal having a voltage value corresponding to a value of the sensed intensity; and a driving signal generator configured to generate the driving signal based on the first and second control signals, the first control signal having the voltage value below the threshold value.

When a voltage value of the output voltage is equal to a voltage value regulated by the output voltage regulator or greater than a minimum critical value, the voltage value of the first control signal is equal to a voltage of the control output terminal, and when the voltage value of the output voltage is below the voltage value regulated by the output voltage regulator and smaller than the minimum critical value, the voltage limiter is configured to limit the voltage value of the first control signal below the threshold value.

When a voltage value of a voltage of the control output terminal is equal to or smaller than a voltage value of a limiting reference voltage, the voltage value of the first control signal is equal to the voltage of the control output terminal, and when the voltage value of the voltage of the control output terminal is greater than the voltage value of the limiting reference voltage, the voltage limiter is configured to limit the voltage value of the first control signal below the threshold value.

The control circuit is configured to adjust the voltage value of the limiting reference voltage.

The control circuit is configured to adjust a voltage value of a regulation reference voltage used to regulate the output voltage.

The regulation current comprises first current components of first intervals where a current value increases and second current components of second intervals where a current value decreases, and the power management chip package further comprises: an input current estimation circuit configured to estimate an intensity of an input current by using the first current components of the first intervals, the input current being generated based on the rectified voltage.

The input current estimation circuit comprises: a current component extractor configured to extract the first current components of the first interval from the regulation current in response to the driving signal; and an estimation signal generator configured to generate an estimation signal based on the extracted first current components, the estimation signal comprising information corresponding to an estimated average intensity of the input current.

The input current estimation circuit further comprises a scaler configured to adjust an amplitude of the estimated average intensity of the input current.

An exemplary embodiment of the present inventive concept may provide a DC-DC converting circuit comprising: a voltage converter configured to generate a regulation current in response to a driving signal and output an output voltage and an output current; an output voltage regulator configured to generate a first control signal in response to the output voltage; a voltage limiter configured to keep a voltage value of the first control signal below a threshold value; a current sensor configured to generate a second control signal in response to the regulation current; and a driving signal generator configured to generate the driving signal in response to the first and second control signals.

The voltage limiter is connected to an output of the output voltage regulator and an input of the driving signal generator.

The voltage limiter includes an operational amplifier, the operational amplifier having a first input terminal configured to receive a first reference voltage and a second input terminal configured to receive the first control signal.

When the voltage value of the first control signal is greater than a voltage value of the first reference voltage, the voltage value of the first control signal is below the threshold value.

The voltage limiter includes a diode, the diode having a cathode connected to an output terminal of the operational amplifier and an anode connected to the second input terminal of the operational amplifier.

BRIEF DESCRIPTION OF THE DRAWINGS

The above and other features of the present inventive concept will become apparent by describing in detail exemplary embodiments thereof with reference to the following figures, wherein.

DETAILED DESCRIPTION OF THE EMBODIMENTS

Figure 1:
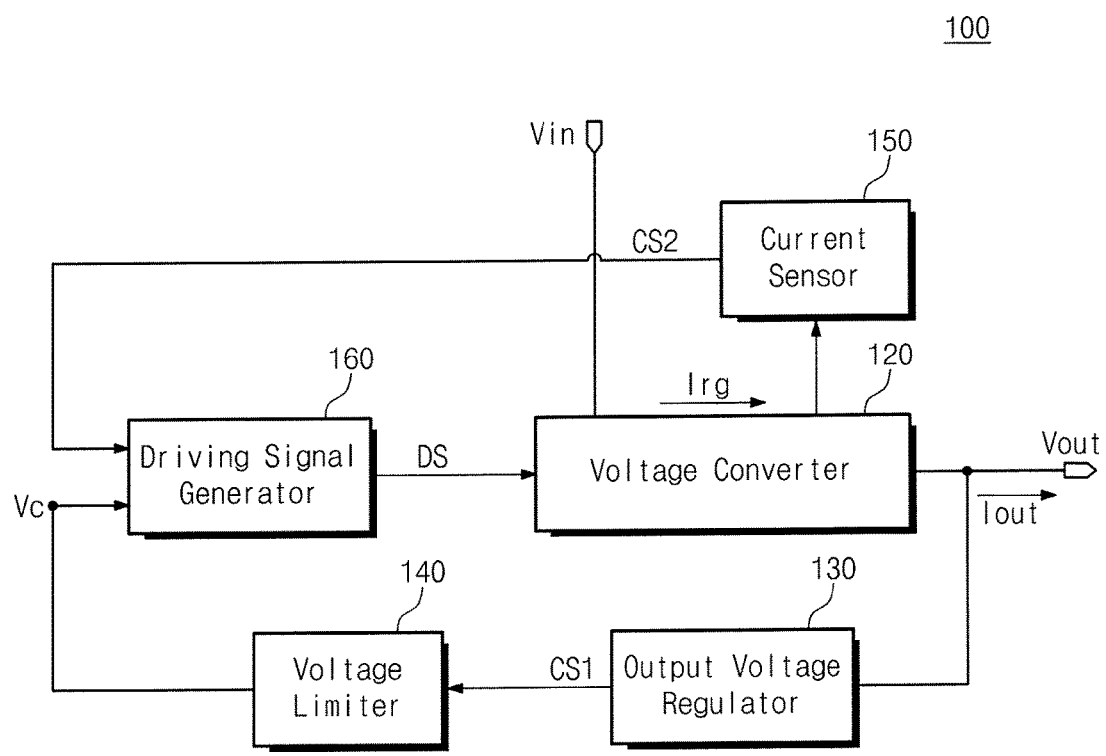
FIG. 1 is a block diagram illustrating a direct current (DC)-DC converting circuit according to an exemplary embodiment of the present inventive concept.

Exemplary embodiments of the present inventive concept will be described in detail below with reference to the accompanying drawings. The present inventive concept, however, may be embodied in various different forms, and should not be construed as being limited only to the illustrated embodiments. Unless otherwise noted, like reference numerals denote like elements throughout the attached drawings and written description, and thus descriptions may not be repeated. In the drawings, the sizes and relative sizes of layers and regions may be exaggerated for clarity.

As used herein, the singular forms "a", "an" and "the" are intended to include the plural forms as well, unless the context clearly indicates otherwise.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram illustrating a direct current (DC)-DC converting circuit 100 according to an exemplary embodiment of the present inventive concept. Referring to FIG. 1, the DC-DC converting circuit 100 may include a voltage converter 120, an output voltage regulator 130, a voltage limiter 140, a current sensor 150, and a driving signal generator 160. The DC-DC converting circuit 100 may receive an input voltage Vin, and may output an output voltage Vout and an output current Iout.

The voltage converter 120 may receive the input voltage Vin. The voltage convertor 120 may receive a driving signal DS. The voltage converter 120 may generate a regulation current Irg in response to the driving signal DS. The regulation current Irg will be described in more detail with reference to FIG. 3. The voltage converter 120 may output the output voltage Vout. In addition, the voltage converter 120 may output the output current Iout, which is generated based on the regulation current Irg. A configuration and an operation of the voltage converter 120 will be described in more detail with reference to FIG. 2.

The output voltage regulator 130 may regulate the output voltage Vout. To achieve this, the output voltage regulator 130 may be connected to a node for outputting the output voltage Vout. Further, the output voltage regulator 130 may generate a first control signal CS1, which is used to control the intensity of the output current Iout. The output voltage regulator 130 may include a control output terminal. The first control signal CS1 may be outputted through the control output terminal. A configuration and an operation of the output voltage regulator 130 will be described in more detail with reference to FIGS. 4 and 5.

The voltage limiter 140 may limit a voltage corresponding to the first control signal CS1. According to the voltage limiter 140, a value of the voltage corresponding to the first control signal CS1 may be kept below a threshold value. A configuration and an operation of the voltage limiter 140 will be described in more detail with reference to FIGS. 9 to 11.

The current sensor 150 may sense the intensity of the regulation current Irg. Further, the current sensor 150 may generate a second control signal CS2. The second control signal CS2 may have a voltage value corresponding to a value of the intensity of the regulation current Irg. The second control signal CS2 may be used to control the intensity of the output current Iout together with the first control signal CS1. A configuration and an operation of the current sensor 150 will be described in more detail with reference to FIG. 6.

The driving signal generator 160 may receive the first control signal CS1. In particular, when the DC-DC converting circuit 100 includes the voltage limiter 140, the first control signal CS1 provided to the driving signal generator 160 may have a voltage value limited below a threshold value. Further, the driving signal generator 160 may receive the second control signal CS2. The driving signal generator 160 may generate the driving signal DS. The driving signal DS may be generated based on the first control signal CS1 and the second control signal CS2. A configuration and an operation of the driving signal generator 160 will be described in more detail with reference to FIGS. 7 and 8.

Figure 2:
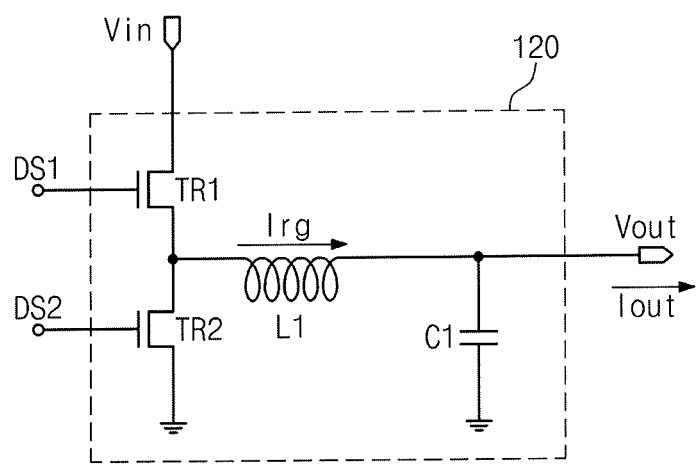
FIG. 2 is a diagram illustrating a voltage converter shown in FIG. 1, according to an exemplary embodiment of the present inventive concept.

FIG. 2 is a diagram illustrating the voltage converter 120 shown in FIG. 1, according to an exemplary embodiment of the present inventive concept. Referring to FIG. 2, the voltage converter 120 may include a first transistor TR1, a second transistor TR2, an inductive element L1, and a capacitive element C1.

A first terminal of the first transistor TR1 may be connected to a node for receiving the input voltage Vin. The second transistor TR2 may be connected between a second terminal of the first transistor TR1 and a ground node. The first transistor TR1 and the second transistor TR may be controlled by a first driving signal DS1 and a second driving signal DS2, respectively. The first driving signal DS1 and the second driving signal DS2 may be included in a driving signal DS (refer to FIG. 1), which is generated by the driving signal generator 160 (refer to FIG. 1). The first transistor TR1 and the second transistor TR2 may be turned on in turn, in response to the first driving signal DS1 and the second driving signal DS2, respectively.

In FIG. 2, the first transistor TR1 and the second transistor TR2 are n-channel metal oxide semiconductor (NMOS) transistors. However, the present inventive concept is not limited thereto. For example, at least one of the first transistor TR1 and the second transistor TR2 may be implemented by a p-channel metal oxide semiconductor (PMOS) transistor. In this case, a process of generating the first driving signal DS1 and the second driving signal DS2 may be different than when two NMOS transistors are included in the voltage converter 120.

One terminal of the inductive element L1 may be connected to the second terminal of the first transistor TR1. When the first transistor TR1 is turned on and the second transistor TR2 is turned off, the intensity of current flowing through the inductive element L1 may increase due to the input voltage Vin. On the other hand, when the first transistor TR1 is turned off and the second transistor TR2 is turned on, the intensity of the current flowing through the inductive element L1 may decrease due to a ground voltage. According to the above-described process, a regulation current Irg flowing through the inductive element L1 may be generated. This will be described in more detail with reference to FIG. 3.

The capacitive element C1 may be connected between a node for outputting the output voltage Vout and the ground node. The capacitive element C1 may be connected to stably output the output current Iout.

In FIG. 2, the inductive element L1 is a discrete inductor and the capacitive element C1 is a discrete capacitor. However, the present inventive concept is not limited thereto. For instance, the inductive element L1 may be implemented by a "simulated inductor" including an operational amplifier and a capacitor. The capacitive element C1 may be implemented by any other element capable of charging and discharging a charge. A configuration of the voltage converter 120 shown FIG. 2 is merely exemplary. Various changes or modifications to the voltage converter 120 may be made.

Figure 3:
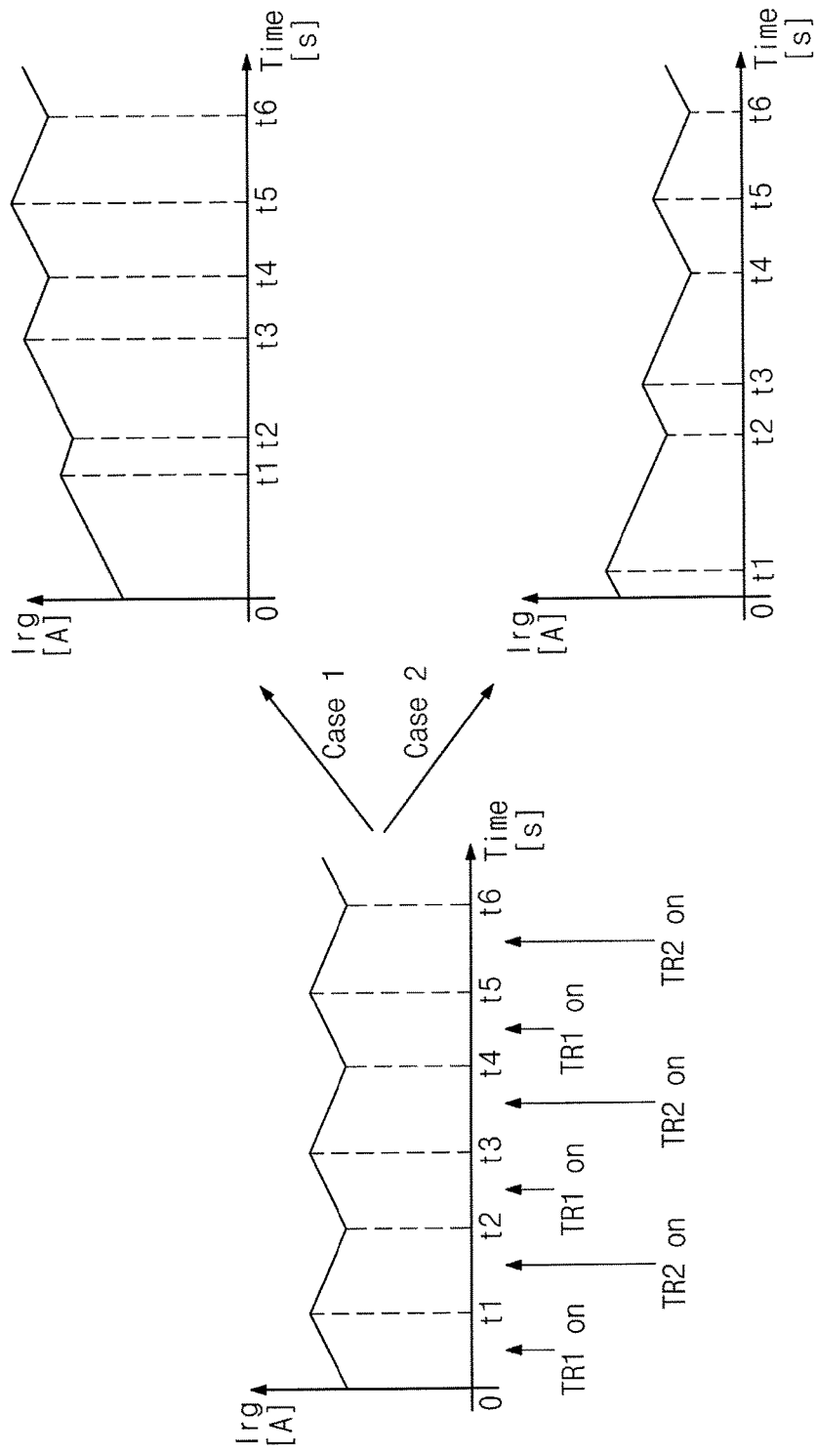
FIG. 3 is a graph for describing a process of controlling the intensity of a regulation current according to an exemplary embodiment of the present inventive concept.

FIG. 3 is a graph for describing a process of controlling the intensity of a regulation current Irg according to an exemplary embodiment of the present inventive concept. In particular, the regulation current Irg of FIG. 3 may be generated by the voltage converter 120 shown in FIG. 2.

Referring to a graph illustrated on the left of FIG. 3, during time intervals from 0 to t1, from t2 to t3, and from t4 to t5, the first transistor TR1 (refer to FIG. 2) may be turned on, and the second transistor TR2 (refer to FIG. 2) may be turned off. When the first transistor TR1 is turned on and the second transistor TR2 is turned off, the intensity of the regulation current Irg may increase due to the input voltage Vin (refer to FIG. 2). On the other hand, during time intervals from t1 to t2, from t3 to t4, and from t5 to t6, the first transistor TR1 may be turned off, and the second transistor TR2 may be turned on. When the first transistor TR1 is turned off and the second transistor TR2 is turned on, the intensity of the regulation current Irg may decrease due to a ground voltage.

As mentioned with reference to FIG. 2, the first transistor TR1 and the second transistor TR2 may be turned on in turn. The regulation current Irg may be generated by turning on the first transistor TR1 and the second transistor TR2 in turn. The regulation current Irg may include first current components of first intervals (e.g., the time intervals from 0 to t1, from t2 to t3, and from t4 to t5) where a current value increases and second current components of second intervals (e.g., the time intervals from t1 to t2, from t3 to t4, and from t5 to t6) where a current value decreases.

As a first case (refer to "Case 1" in FIG. 3), the case where the intensity of the regulation current Irg increases will be described with reference to a graph illustrated on the upper-right of FIG. 3. When lengths of time intervals (e.g., the first intervals—0 to t1, t2 to t3, and t4 to t5) where the first transistor TR 1 is turned on become longer and lengths of time intervals (e.g., the second intervals –t1 to t2, t3 to t4, and t5 to t6) where the second transistor TR2 is turned on become shorter, the intensity of the regulation current Irg may increase. When the regulation current Irg has a desired intensity, the lengths of the time intervals where the first transistor TR1 is turned on may become identical to the lengths of the time intervals where the second transistor TR2 is turned on, to thereby increase the intensity of the regulation current Irg.

As a second case (refer to "Case 2" in FIG. 3), the case where the intensity of the regulation current Irg decreases will be described with reference to a graph illustrated on the lower-right of FIG. 3. When lengths of time intervals (e.g., the first intervals—0 to t1, t2 to t3, and t4 to t5) where the first transistor TR 1 is turned on become shorter and lengths of time intervals (e.g., the second intervals –t1 to t2, t3 to t4, and t5 to t6) where the second transistor TR2 is turned on become longer, the intensity of the regulation current Irg may decrease. When the regulation current Irg has a desired intensity, the lengths of the time intervals where the second transistor TR2 is turned on may become identical to the lengths of the time intervals where the first transistor TR1 is turned on, to thereby decrease the intensity of the regulation current Irg.

The lengths of the time periods where each of the first transistor TR1 and the second transistor TR2 is turned on may be adjusted when the first driving signal DS1 and the second driving signal DS2 (refer to FIG. 2) included in the driving signal DS (refer to FIG. 1) are controlled. Accordingly, the intensity of the regulation current Irg may be adjusted by controlling the first driving signal DS1 and the second driving signal DS2.

Figure 4:
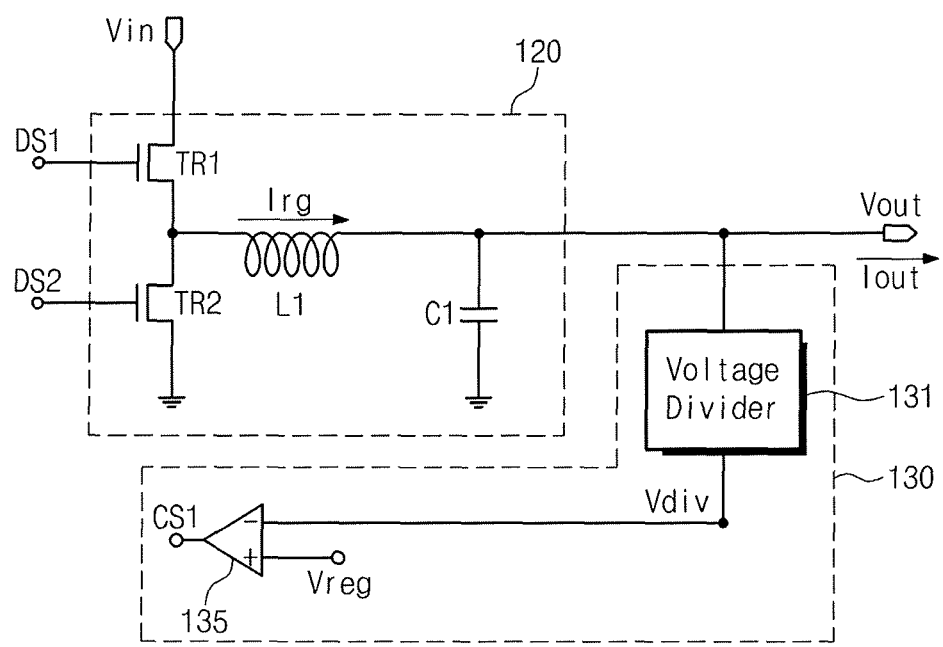
FIG. 4 is a diagram illustrating an output voltage regulator shown in FIG. 1, according to an exemplary embodiment of the present inventive concept.

FIG. 4 is a diagram illustrating the output voltage regulator 130 shown in FIG. 1, according to an exemplary embodiment of the present inventive concept. Referring to FIG. 4, the output voltage regulator 130 may include a voltage divider 131 and a regulation operational amplifier 135.

The voltage divider 131 may be connected to a node for outputting the output voltage Vout. The voltage divider 131 may generate a division voltage Vdiv. In an exemplary embodiment of the present inventive concept, a voltage value of the division voltage Vdiv may be controlled to be proportional to a voltage value of the output voltage Vout. A configuration and a function of the voltage divider 131 will be described in more detail with reference to FIG. 5.

The regulation operational amplifier 135 may include two input terminals. One of the input terminals of the regulation operational amplifier 135 may be connected to a node for receiving a regulation reference voltage Vreg. The regulation reference voltage Vreg is a voltage which is used to regulate the output voltage Vout. The other input terminal of the regulation operational amplifier 135 may be connected to a node for receiving the division voltage Vdiv.

In an exemplary embodiment of the present inventive concept, a voltage value of the regulation reference voltage Vreg may be adjustable. According to a characteristic of the regulation operational amplifier 135, the division voltage Vdiv may have the same voltage value as the regulation reference voltage Vreg. Hence, the voltage value of the division voltage Vdiv may be adjusted by adjusting the voltage value of the regulation reference voltage Vreg. As a result, the output voltage Vout having a desired voltage value may be regulated by controlling the regulation reference voltage Vreg.

The regulation operational amplifier 135 may include a control output terminal. The regulation operational amplifier 135 may output the first control signal CS1 through the control output terminal. The first control signal CS1 may be generated by using the regulation reference voltage Vreg and the division voltage Vdiv. In an exemplary embodiment of the present inventive concept, the first control signal CS1 may be generated based on a difference between the voltage value of the regulation reference voltage Vreg and the voltage value of the division voltage Vdiv. The first control signal CS1 may be used to control the intensity of the output current Iout.

Figure 5:
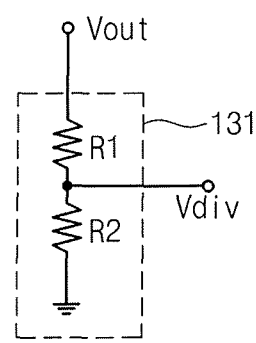
FIG. 5 is a diagram illustrating a voltage divider shown in FIG. 4, according to an exemplary embodiment of the present inventive concept.

FIG. 5 is a diagram illustrating the voltage divider 131 shown in FIG. 4, according to an exemplary embodiment of the present inventive concept. Referring to FIG. 5, the voltage divider 131 may include a first resistive element R1 and a second resistive element R2.

A first terminal of the first resistive element R1 may be connected to a node for outputting the output voltage Vout. The second resistive element R2 may be connected between a second terminal of the first resistive element R1 and a ground node. The output voltage Vout may be divided by the first resistive element R1 and the second resistive element R2. In an exemplary embodiment of the present inventive concept, the division voltage Vdiv may be a voltage of the second terminal of the first resistive element R1. For example, a voltage value of the division voltage Vdiv may be controlled to be proportional to a voltage value of the output voltage Vout. The division voltage Vdiv may be provided to one of the input terminals of the regulation operational amplifier 135 (refer to FIG. 4).

It is to be understood that the output voltage regulator 130 may have a configuration different from those shown in FIGS. 4 and 5. For example, in FIG. 5 the first resistive element R1 and the second resistive element R2 are discrete resistors. However, the first resistive element R1 and the second resistive element R2 may be implemented by any other element causing a voltage drop.

Figure 6:
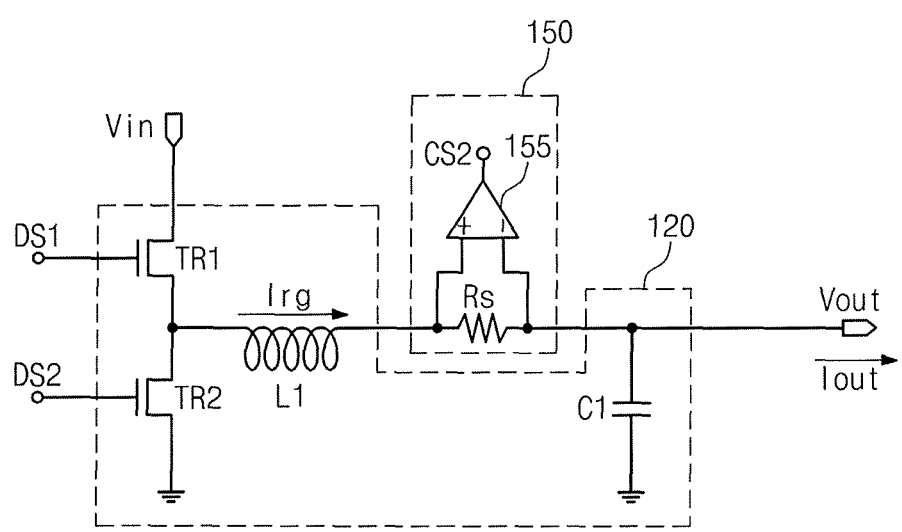
FIG. 6 is a diagram illustrating a current sensor shown in FIG. 1, according to an exemplary embodiment of the present inventive concept.

FIG. 6 is a diagram illustrating the current sensor 150 shown in FIG. 1, according to an exemplary embodiment of the present inventive concept. Referring to FIG. 6, the current sensor 150 may include a sense resistor Rs and a current sense amplifier 155.

The sense resistor Rs may be connected between a node for outputting the output voltage Vout and one terminal of the inductive element L1 of the voltage converter 120. Accordingly, a regulation current Irg flowing through the inductive element L1 may flow through the sense resistor Rs. In an exemplary embodiment of the present inventive concept, the sense resistor Rs is a discrete resistor. However, the present inventive concept is not limited thereto. For instance, the sense resistor Rs may be implemented by any other element causing a voltage drop.

The current sense amplifier 155 may sense the intensity of the regulation current Irg. In particular, the current sense amplifier 155 may sense the intensity of the regulation current Irg flowing through the sense resistor Rs. The current sense amplifier 155 may output the second control signal CS2 based on the sensing result. The second control signal CS2 may have a voltage value corresponding to a value of the sensed intensity of the regulation current Irg. The second control signal CS2 may be used to control the intensity of the output current Iout together with the first control signal CS1 (refer to FIG. 1).

It is to be understood that a configuration of the current sensor 150 shown in FIG. 6 is merely exemplary. A configuration of the current sensor 150 may be changed or modified to be different from that shown in FIG. 6. For example, the current sensor 150 may just be configured for sensing the intensity of the regulation current Irg and outputting the second control signal CS2.

Figure 7:
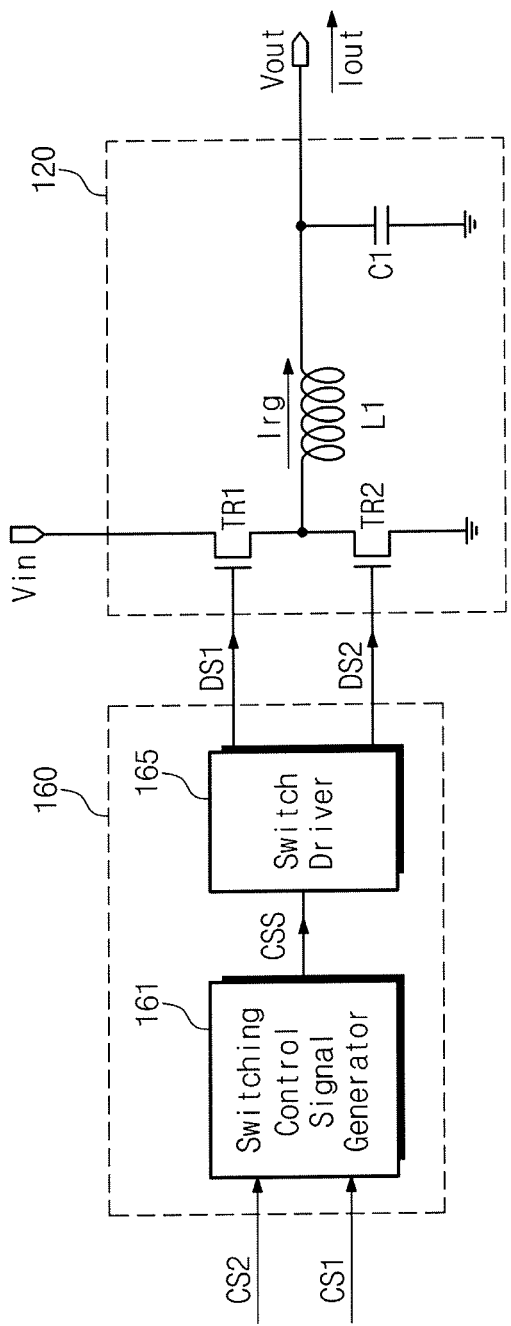
FIG. 7 is a diagram illustrating a driving signal generator shown in FIG. 1, according to an exemplary embodiment of the present inventive concept.

FIG. 7 is a diagram illustrating the driving signal generator 160 shown in FIG. 1, according to an exemplary embodiment of the present inventive concept. Referring to FIG. 7, the driving signal generator 160 may include a switching control signal generator 161 and a switch driver 165.

The switching control signal generator 161 may receive the first control signal CS1 and the second control signal CS2. In an exemplary embodiment of the present inventive concept, the first control signal CS1 may be outputted from the regulation operational amplifier 135 (refer to FIG. 4) of the output voltage regulator 130 (refer to FIG. 1), and then may be provided to the switching control signal generator 161 through the voltage limiter 140 (refer to FIG. 1). In an exemplary embodiment of the present inventive concept, the second control signal CS2 may be provided from the current sense amplifier 155 (refer to FIG. 6) of the current sensor 150 (refer to FIG. 1). In an exemplary embodiment of the present inventive concept, the first control signal CS1 to be provided to the switching control signal generator 161 may have a voltage value limited below a threshold value.

The switching control signal generator 161 may generate a switching control signal CSS. The switching control signal CSS may be generated by using the first control signal CS1 and the second control signal CS2.

The switch driver 165 may receive the switching control signal CSS. The switch driver 165 may generate the driving signal DS (refer to FIG. 1) according to the switching control signal CSS. For instance, the switch driver 165 may generate the first driving signal DS1 and the second driving signal DS2. The first driving signal DS1 may be provided to a control terminal of a first transistor TR1, and the second driving signal DS2 may provided to a control terminal of a second transistor TR2. The first transistor TR1 and the second transistor TR2 may be turned on in turn, in response to the first driving signal DS1 and the second driving signal DS2, respectively.

As mentioned above, the first control signal CS1 and the second control signal CS2 may be used to control the intensity of the output current Iout. The first driving signal DS1 and the second driving signal DS2 may be controlled based on the first control signal CS1 and the second control signal CS2, to thereby adjust the intensity of a regulation current Irg as described with reference to FIG. 3.

Figure 8:
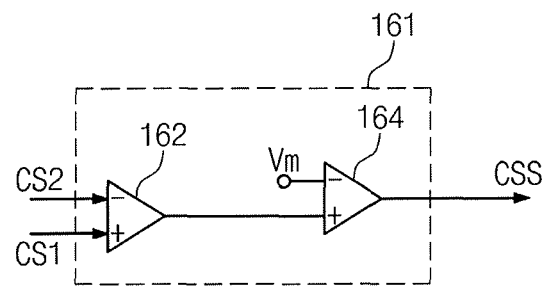
FIG. 8 is a diagram illustrating a switching control signal generator shown in FIG. 7, according to an exemplary embodiment of the present inventive concept.

FIG. 8 is a diagram illustrating a switching control signal generator 161 shown in FIG. 7, according to an exemplary embodiment of the present inventive concept. Referring to FIG. 8, the switching control signal generator 161 may include a comparison operational amplifier 162 and a modulator 164.

The comparison operational amplifier 162 may include two input terminals. The comparison operational amplifier 162 may receive the first control signal CS1 and the second control signal CS2 through the two input terminals. In an exemplary embodiment of the present inventive concept, the first control signal CS1 provided to the comparison operational amplifier 162 may have a voltage value limited below a threshold value.

As mentioned above, the second control signal CS2 may have a voltage value corresponding to a value of a sensed intensity of the regulation current Irg (refer to FIG. 1). However, the regulation current Irg may include first current components of first intervals where a current value increases and second current components of second intervals where a current value decreases. Thus, the second control signal CS2 may include ripples. The comparison operational amplifier 162 may output an output voltage of which ripples are removed, by using the first control signal CS1 together with the second control signal CS2.

The modulator 164 may receive a modulation voltage Vm. Further, the modulator 164 may receive the output voltage of the comparison operational amplifier 162. The modulator 164 may, for instance, perform pulse width modulation by using the modulation voltage Vm and the output voltage of the comparison operational amplifier 162. The modulator 164 may generate the switching control signal CSS as the modulation result. The switching control signal CSS may be provided to the switch driver 165 (refer to FIG. 7).

It is to be understood that the driving signal generator 160 may be configured to be different from that shown in FIGS. 7 and 8.

Figure 9:
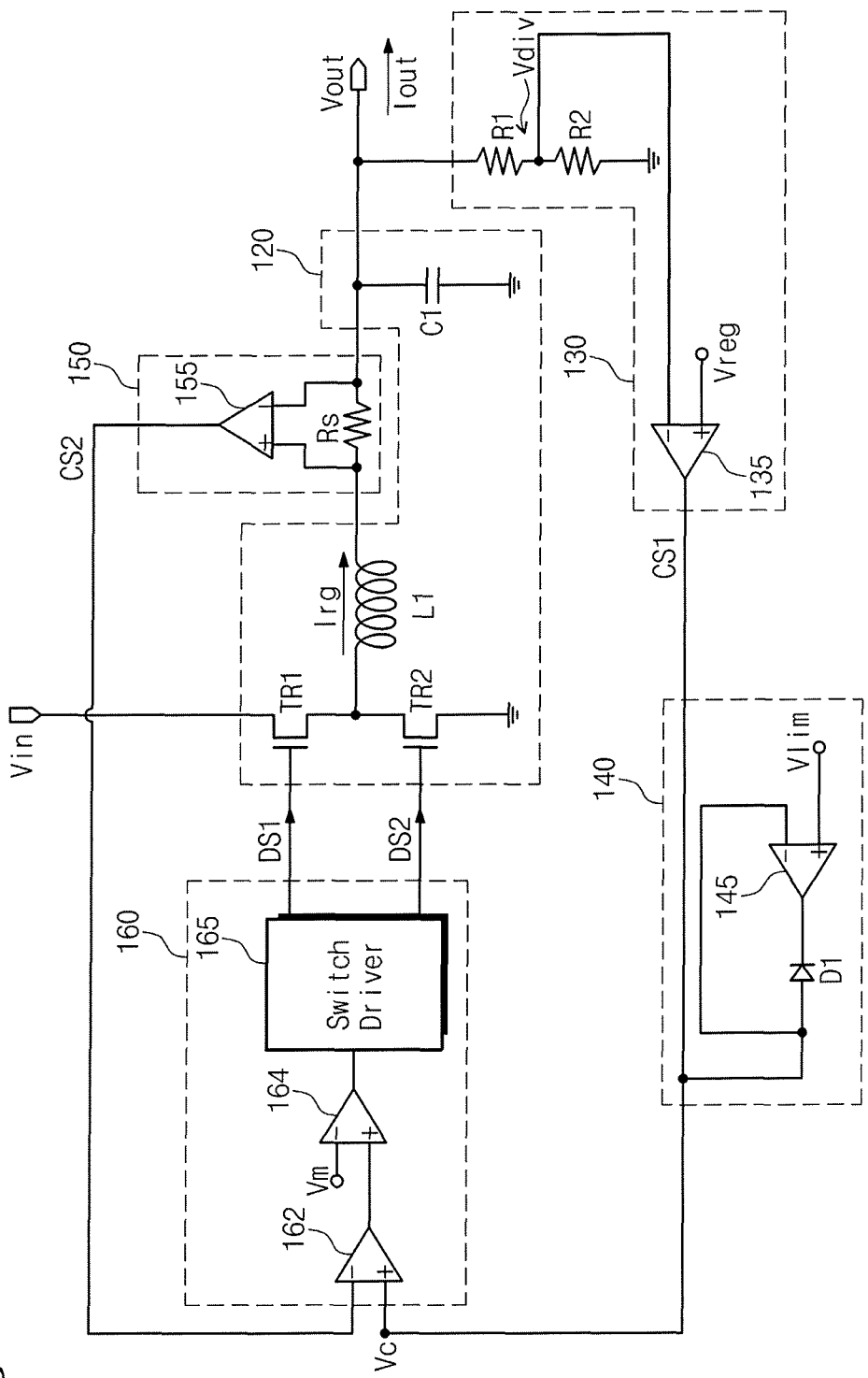
FIG. 9 is a diagram illustrating a DC-DC converting circuit according to an exemplary embodiment of the present inventive concept.

FIG. 9 is a diagram illustrating a DC-DC converting circuit 100 according to an exemplary embodiment of the present inventive concept. Referring to FIG. 9, the DC-DC converting circuit 100 may include a voltage convertor 120, an output voltage regulator 130, a current sensor 150, and a driving signal generator 160. In particular, the voltage convertor 120, the output voltage regulator 130, the current sensor 150, and the driving signal generator 160 are similar to those described above with reference to FIGS. 1 to 8. Accordingly, redundant descriptions on configurations and functions of the voltage convertor 120, the output voltage regulator 130, the current sensor 150, and the driving signal generator 160 may be omitted.

In an exemplary embodiment of the present inventive concept, a voltage limiter 140 may include a diode D1 and a limiting operational amplifier 145. The limiting operational amplifier 145 may include a first input terminal (+), a second input terminal (−), and a comparison output terminal. The limiting operational amplifier 145 may receive a limiting reference voltage Vlim through the first input terminal (+). The limiting reference voltage Vlim is a voltage which is used to limit a voltage value of a voltage corresponding to a first control signal CS1 below a threshold value. The limiting operational amplifier 145 may receive a voltage of a control output terminal of the output voltage regulator 130 through the second input terminal (−). The limiting operational amplifier 145 may, for instance, compare the amplitude of the limiting reference voltage Vlim and the amplitude of the voltage of the control output terminal of the output voltage regulator 130. The limiting operational amplifier 145 may output the comparison result through the comparison output terminal.

In an exemplary embodiment of the present inventive concept, an anode of the diode D1 may be connected to the second input terminal (−) of the limiting operational amplifier 145. A cathode of the diode D1 may be connected to the comparison output terminal of the limiting operational amplifier 145. In this case, the voltage limiter 140 may limit the voltage value of the voltage corresponding to the first control signal CS1 below a voltage value of the reference voltage Vlim.

When a voltage value of the voltage of the control output terminal of the output voltage regulator 130 is equal to or smaller than a voltage value of the limiting reference voltage Vlim (e.g., when the voltage value of the limiting reference voltage Vlim is greater than the voltage value of the voltage of the control output terminal), an electric signal having a "positive" characteristic is outputted from the comparison output terminal of the limiting operational amplifier 145. However, a signal outputted from the limiting operational amplifier 145 does not pass through the diode D1, because the cathode of the diode D1 is connected to the limiting operational amplifier 145. Thus, the voltage corresponding to the first control signal CS1 may become equal to the voltage of the control output terminal of the output voltage regulator 130 without being influenced by the voltage limiter 140.

On the other hand, when the voltage value of the voltage of the control output terminal of the output voltage regulator 130 is greater than the voltage value of the limiting reference voltage Vlim (e.g., the voltage value of the limiting reference voltage Vlim is smaller than the voltage value of the voltage of the control output terminal), an electric signal having a "negative" characteristic is outputted from the comparison output terminal of the limiting operational amplifier 145. Thus, a signal may flow along a direction from the anode to the cathode of the diode D1. Accordingly, the voltage corresponding to the first control signal CS1 may be affected by the voltage limiter 140. In particular, the voltage limiter 140 may maintain a voltage value of the voltage corresponding to the first control signal CS1 below a threshold value.

In short, when the voltage value of the voltage of the control output terminal of the output voltage regulator 130 is equal to or smaller than the voltage value of the limiting reference voltage Vlim, the voltage corresponding to the first control signal CS1 may become equal to the voltage of the control output terminal of the output voltage regulator 130. On the other hand, when the voltage value of the voltage of the control output terminal of the output voltage regulator 130 is greater than the voltage value of the limiting reference voltage Vlim, the voltage limiter 140 may maintain (e.g., limit) the voltage value of the voltage corresponding to the first control signal CS1 below a threshold value.

In an exemplary embodiment of the present inventive concept, the voltage value of the limiting reference voltage Vlim may be adjustable. For example, a threshold value for limiting the voltage value of the voltage corresponding to the first control signal CS1 may be adjusted. In this case, the threshold value may be adjusted by adjusting the voltage value of the limiting reference voltage Vlim.

It is to be understood that a configuration of the voltage limiter 140 shown in FIG. 9 is merely exemplary. The voltage limiter 140 may be configured to be different from that shown in FIG. 9. For example, the voltage limiter 140 may be configured just to limit the voltage value of the voltage corresponding to the first control signal CS1 below a threshold value.

The DC-DC converting circuit 100 according to an exemplary embodiment of the present inventive concept may include the voltage limiter 140, thereby making it possible for the DC-DC converting circuit 100 to perform various functions. To help further understand the present inventive concept, descriptions will be made with respect to the following cases where: (a) the DC-DC converting circuit does not include the voltage limiter 140, and (b) the DC-DC converting circuit includes the voltage limiter 140.

Referring to FIG. 9, the DC-DC converting circuit 100 may receive an input voltage Vin, and may output an output voltage Vout and an output current Iout. The output voltage Vout and the output current Iout, which are outputted from the DC-DC converting circuit 100, may be provided to other circuit(s), chip(s), or system(s). Another circuit(s), chip(s), or system(s) that receives the output voltage Vout and the output current Iout may perform its own function by using the received output voltage Vout and the received output current Iout. In other words, the DC-DC converting circuit 100 may provide a voltage and/or a current which are used in a variety of circuit(s), chip(s), or system(s).

Figure 21:
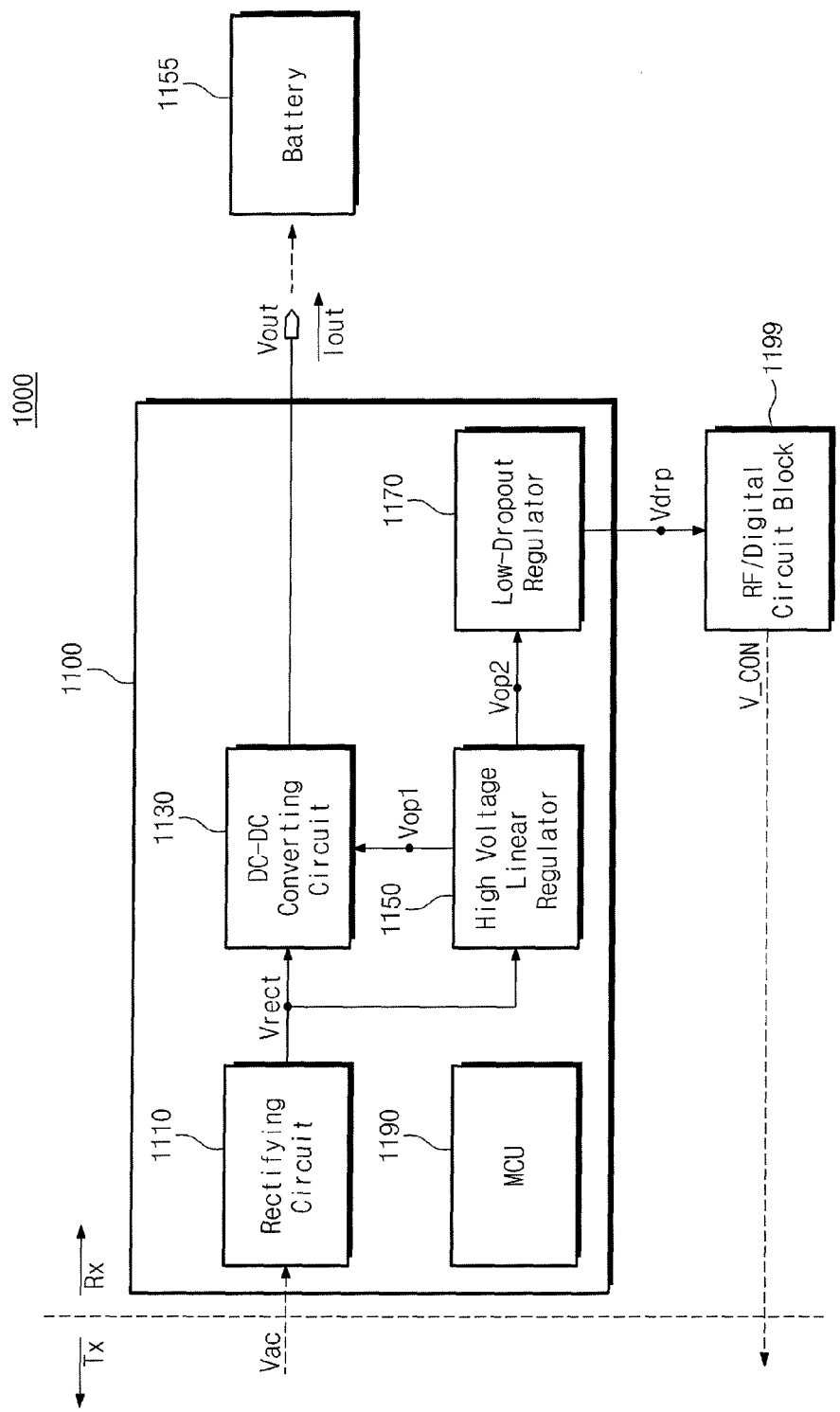
FIG. 21 is a block diagram illustrating a receiver of a power transferring system including a DC-DC converting circuit according to an exemplary embodiment of the present inventive concept.

For instance, it is assumed that a battery of a handheld electronic device (e.g., a mobile phone) is connected to a node for outputting an output voltage Vout (refer to FIG. 21). In this instance, the output voltage Vout and the output current Iout may correspond to a charging voltage and a charging current, respectively, which are used to charge the battery. In other words, when the battery is not fully charged it may be charged by using the output voltage Vout and the output current Iout. An appropriate regulation reference voltage Vreg may be provided to a regulation operational amplifier 135 to charge the battery. Further, a voltage value of a division voltage Vdiv may be adjusted according to a voltage value of the regulation reference voltage Vreg. Thus, the output voltage Vout used to charge the battery may be regulated.

However, a voltage of an input terminal of the battery connected to the node for outputting the output voltage Vout may have a voltage value smaller than a voltage value of the output voltage Vout. The reason for this is that a smaller amount of charge is stored in the battery when the battery is not fully charged. For instance, the output voltage Vout used to charge the battery may have a voltage value of about 4.2 V, but an input terminal voltage of the battery which is fully discharged may have a voltage value of about 2.5 V. For this reason, when the battery, which is not fully charged, is connected to the node for outputting the output voltage Vout, the output voltage Vout may have a voltage value of the input terminal voltage of the battery, not a voltage value regulated based on the regulation reference voltage Vreg. In other words, when the battery, which is not fully charged, is connected to the node for outputting the output voltage Vout, the voltage value of the output voltage Vout may be forcibly dropped.

When a voltage value of the output voltage Vout is dropped to the voltage value of the input terminal voltage of the battery, which is not fully charged, a voltage value of the division voltage Vdiv is also dropped. Thus, the voltage value of the division voltage Vdiv becomes smaller than a voltage value of the regulation reference voltage Vref. As a result, the voltage value of the voltage corresponding to the first control signal CS1 outputted from the regulation operational amplifier 135 may increase.

When the voltage limiter 140 is not included in the DC-DC converting circuit 100, the first control signal CS1 having the increased voltage value is provided to a first input terminal of a comparison operational amplifier 162 of the driving signal generator 160. According to a characteristic of the comparison operational amplifier 162, when a voltage value of a voltage corresponding to the first control signal CS1 provided to the first input terminal increases, a voltage value of a voltage corresponding to a second control signal CS2 provided to a second input terminal of the comparison operational amplifier 162 also increases. When the voltage value of the voltage corresponding to the second control signal CS2 increases, the intensity of a regulation current Irg flowing through a sense resistor Rs in the current sensor 150 may increase. As a result, the intensity of the output current Iout increases.

In short, when the DC-DC converting circuit does not include the voltage limiter 140 and the battery, which is not fully charged, is connected to the DC-DC converting circuit 100, the intensity of the output current Iout may increase. When the intensity of the output current Iout increases, power consumption and heat emission may increase. Moreover, the output current Iout having the increased intensity may not be suitable to charge the battery.

Accordingly, in some cases, a mobile electronic device using a battery may further include an additional converting circuit or chip (e.g., a charger) for charging the battery, other than the DC-DC converting circuit 100. Functions of the additional converting circuit or chip may be substantially the same as those of the DC-DC converting circuit 100. When the additional converting circuit or chip, which has duplicate functions of the DC-DC converting circuit 100, is included in a mobile electronic device, a circuit area may increase and a conversion efficiency may decrease.

On the other hand, when the DC-DC converting circuit 100 includes the voltage limiter 140 according to an exemplary embodiment of the present inventive concept, a voltage Vc corresponding to the first control signal CS1 may be limited to have a voltage value below a threshold value. Thus, the first control signal CS1 having a voltage value equal to or smaller than the threshold value may be provided to the comparison operational amplifier 162.

When the voltage value of the voltage (e.g., Vc) corresponding to the first control signal CS1 provided to the first input terminal of the comparison operational amplifier 162 is limited below the threshold value, the voltage value of the voltage corresponding to the second control signal CS2 provided to the second input terminal of the comparison operational amplifier 162 may also be limited. Thus, the intensity of the regulation current Irg flowing through the sense resistor Rs of the current sensor 150 may not increase. Accordingly, the output current Iot may be stably outputted.

In short, when the voltage value of the output voltage Vout is dropped below the voltage value regulated by the output voltage regulator 130, the voltage limiter 140 may maintain (e.g., limit) the voltage value of the voltage corresponding to the first control signal CS1 below the threshold value (e.g., a voltage value of the limiting reference voltage Vlim).

So far, a case that a battery, which is not fully charged, is connected to the DC-DC converting circuit 100 has been described. When the battery remains connected to the DC-DC converting circuit 100, the battery is charged by the output current Iout. As the battery is charged, the voltage value of the input terminal voltage of the battery may gradually increase.

When the voltage value of the input terminal voltage of the battery increases, the voltage value of the output voltage Vout also increases. When the voltage value of the output voltage Vout increases, the voltage value of the division voltage Vdiv may increase. Thus, a difference between the voltage value of the division voltage Vdiv and the voltage value of the regulation reference voltage Vreg may decrease. As a result, the voltage value of the voltage corresponding to the first control signal CS1 outputted from the regulation operational amplifier 135 may decrease.

When the voltage value of the voltage corresponding to the first control signal CS1 provided to the first input terminal of the comparison operational amplifier 162 decreases, the voltage value of the voltage corresponding to the second control signal CS2 provided to the second input terminal of the comparison operational amplifier 162 also decreases. Thus, the intensity of the regulation current Irg flowing through the sense resistor Rs of the current sensor 150 may decrease. Accordingly, the intensity of the output current Iout decreases. As the intensity of the output current Iout decreases, the voltage value of the input terminal voltage of the battery gradually increases. The intensity of the output current Iout may approach to '0' as the battery is fully charged. The battery may be charged according to the above-described process.

As described above, the DC-DC converting circuit 100 including the voltage limiter 140 according to an exemplary embodiment of the present inventive concept may perform various functions. In an exemplary embodiment of the present inventive concept, the DC-DC converting circuit 100 may operate as a charger circuit. Thus, the DC-DC converting circuit 100 according to an exemplary embodiment of the present inventive concept may be solely provided without an additional converting circuit. Thus, when a chip, a device, or a system includes the DC-DC converting circuit 100 according to an exemplary embodiment of the present inventive concept, a circuit area in the chip, the device, or the system may decrease and conversion efficiency may increase.

Figure 10:
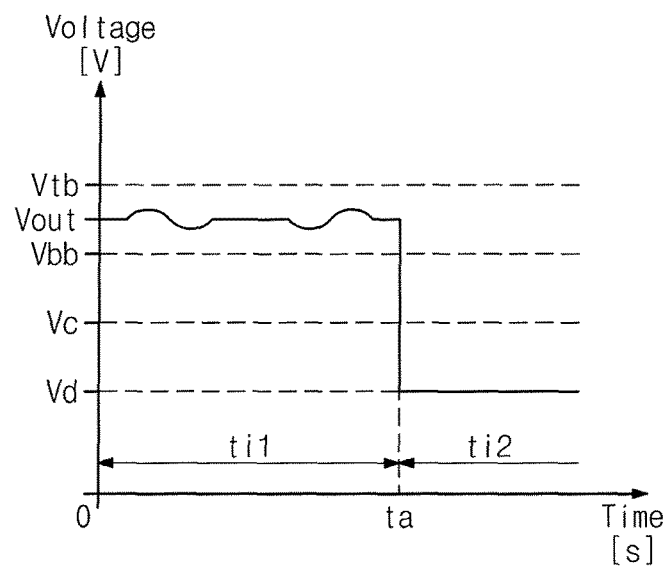
FIG. 10 is a graph for describing a case when a voltage value of an output voltage of a DC-DC converting circuit is forcibly dropped, according to an exemplary embodiment of the present inventive concept.
Figure 11:
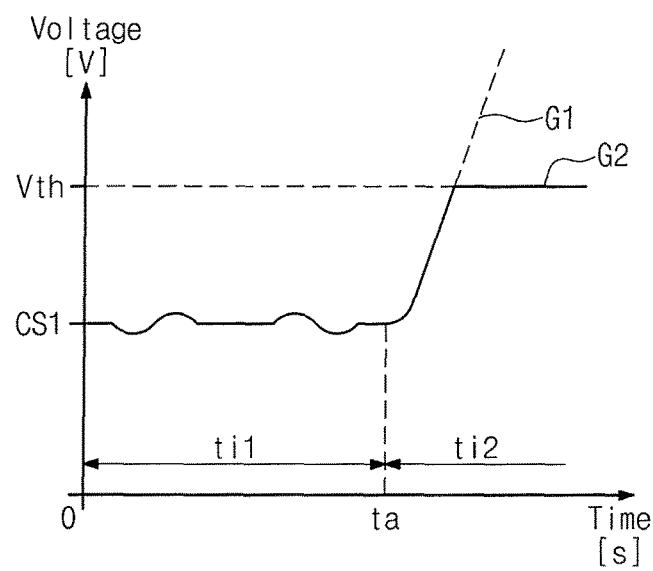
FIG. 11 is a graph for describing a process of limiting a voltage value corresponding to a first control signal according to an exemplary embodiment of the present inventive concept.

FIG. 10 is a graph for describing a case when a voltage value of an output voltage Vout of a DC-DC converting circuit is forcibly dropped, according to an exemplary embodiment of the present inventive concept. FIG. 11 is a graph for describing a process of limiting a voltage value corresponding to a first control signal CS1 according to an exemplary embodiment of the present inventive concept. Operations of the voltage limiter 140 shown in FIG. 9 will be described in more detail with reference to FIGS. 9 to 11.

In FIG. 10, a solid line denotes a variation in a voltage value of an output voltage Vout. During a normal time interval ti1, the voltage value of the output voltage Vout may be constantly maintained or fluctuate within a narrow-ranged margin. For instance, the voltage value of the output voltage Vout may be constantly maintained at a voltage value regulated by the output voltage regulator 130. However, the voltage value of the output voltage Vout may fluctuate within an interval defined by a top boundary value Vtb and a bottom boundary value Vbb, depending on states of circuit elements or surrounding conditions.

A minimum critical value Vc may be a minimum voltage value that the voltage value of the output voltage Vout should have, to stably output an output current Iout. When the voltage value of the output voltage Vout is smaller than the minimum critical value Vc, a voltage value of a voltage corresponding to a first control signal CS1 may increase, and thus, the intensity of the output current Iout may increase.

The top boundary value Vtb and the bottom boundary value Vbb are greater than the minimum critical value Vc. Thus, even though the voltage value of the output voltage Vout fluctuates within the interval defined by the top boundary value Vtb and the bottom boundary value Vbb, its impact to the DC-DC converting circuit 100 may not be great. When fluctuating, however, the voltage value of the output voltage Vout may be maintained at a desired value by controlling the first control signal CS1.

In addition, in FIG. 11, during the normal time interval ti1, the voltage value of the voltage corresponding to the first control signal CS1 may be smaller than a threshold value Vth. This is why the voltage value of the output voltage Vout is maintained over the minimum critical value Vc. During the normal time interval ti1, the voltage value of the voltage corresponding to the first control signal CS1 is maintained below the threshold value Vth, even though the voltage limiter 140 does not operate.

On the other hand, at a specific time ta, the voltage value of the output voltage Vout may be dropped to a drop voltage value Vd which is smaller than the minimum critical value Vc. For instance, when a battery, which is not fully charged, is connected to a node for outputting the output voltage Vout at the specific time ta, the voltage value of the output voltage Vout may be dropped to the drop voltage value Vd. As a result, the voltage value of the voltage corresponding to the first control signal CS1 may increase in a limitation time interval ti2 after the specific time ta.

When the voltage value of the voltage corresponding to the first control signal CS1 continues to increase during the limitation time interval ti2 (refer to dashed line G1 of FIG. 11), as described above, an output of the output current Iout may become unstable. Thus, in an exemplary embodiment of the present inventive concept, the voltage limiter 140 may limit the voltage value of the voltage corresponding to the first control signal CS1 below the threshold value Vth (refer to solid line G2 of FIG. 11). When the voltage value of the voltage corresponding to the first control signal CS1 is limited below the threshold value Vth, the output current Iout may be stably outputted.

For instance, when the voltage value of the output voltage Vout is equal to a voltage value regulated by the output voltage regulator 130 or greater than the minimum critical value Vc, a voltage value of a voltage of the control output terminal of the output voltage regulator 130 may be below the limiting reference voltage Vlim. In this instance, the voltage corresponding to the first control signal CS1 may be equal to the voltage of the control output terminal of the output voltage regulator 130. In addition, the voltage value of the voltage corresponding to the first control signal CS1 may be limited below the threshold value Vth (refer to the normal time interval ti1).

On the other hand, for instance, when the voltage value of the output voltage Vout decreases below the voltage value regulated by the output voltage regulator 130 and then becomes smaller than the minimum critical value Vc, the voltage value of the voltage of the control output terminal of the output voltage regulator 130 may become greater than a voltage value of the limiting reference voltage Vlim. In this instance, the voltage limiter 140 may limit the voltage value of the voltage corresponding to the first control signal CS1 below the threshold value Vth. Thus, the voltage value of the voltage corresponding to the first control signal CS1 may be maintained below the threshold value Vth (refer to the solid line G2 in the limitation time interval ti2).

Figure 12:
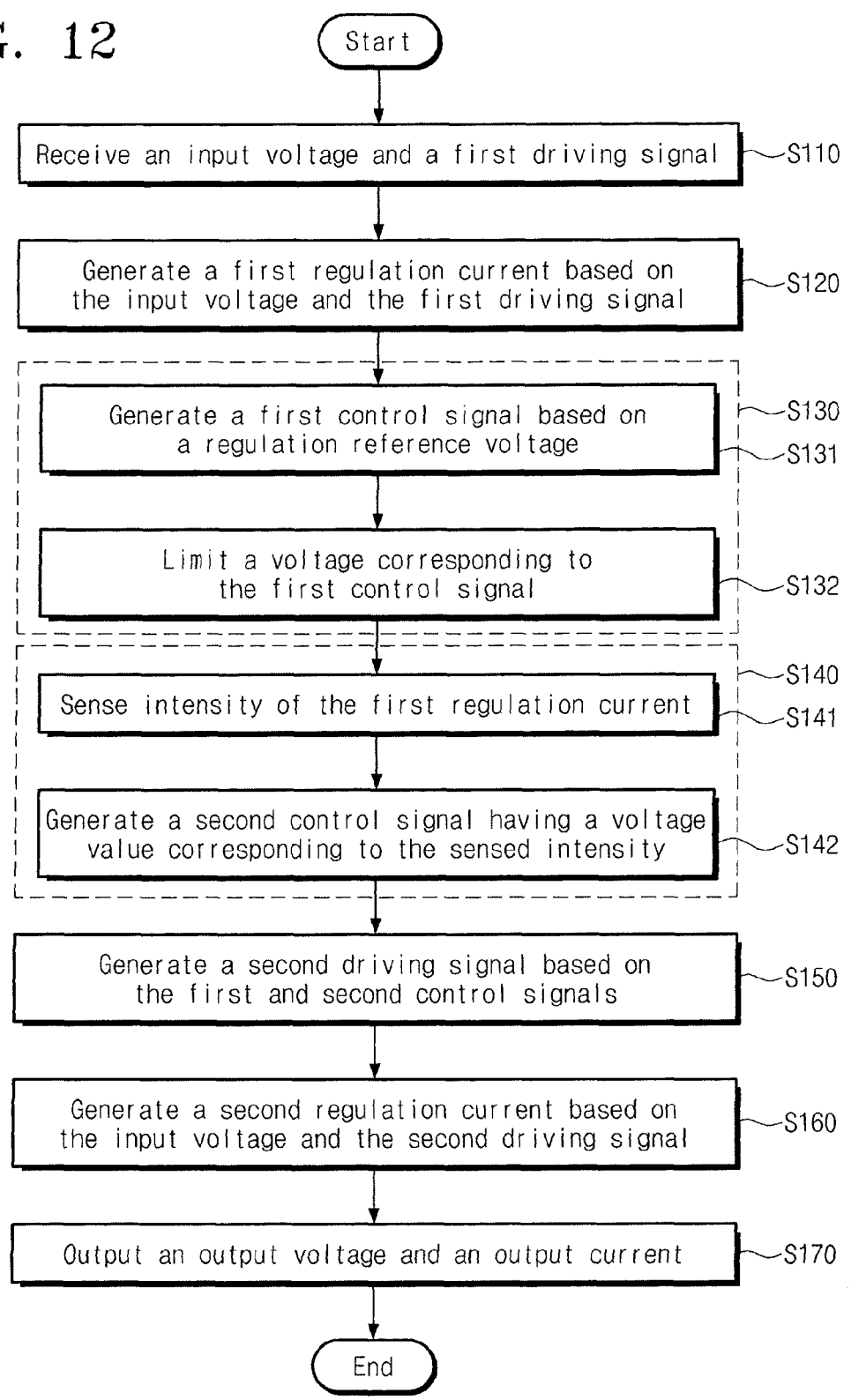
FIG. 12 is a flow chart for describing an operation of a DC-DC converting circuit according to an exemplary embodiment of the present inventive concept.

FIG. 12 is a flow chart for describing an operation of a DC-DC converting circuit according to an exemplary embodiment of the present inventive concept. In describing FIG. 12, reference will be made to signals/circuits in FIG. 1 or 9.

In operation S110, an input voltage (e.g., Vin) and a first driving signal (e.g., DS1) may be received (e.g., at voltage converter 120). In operation S120, a first regulation current (e.g., Irg) may be generated (e.g., at voltage converter 120). The first regulation current may be generated based on the input voltage and the first driving signal received in operation S110. The first regulation current may have a waveform shown in FIG. 3.

In operation S130, a first control signal (e.g., CS1) may be generated (e.g., at output voltage regulator 130). In detail, in operation S131, the first control signal may be generated based on a regulation reference voltage (e.g., Vreg). In particular, in operation S132, a voltage corresponding to the first control signal may be limited according to an exemplary embodiment of the present inventive concept. The voltage corresponding to the first control signal may be limited to have a voltage value below a threshold value.

In operation S140, a second control signal (e.g., CS2) may be generated (e.g., at current sensor 150). In detail, in operation S141, the intensity of the first regulation current (e.g., Irg) may be sensed. Further, in operation S142, the second control signal may be generated. The second control signal may have a voltage value corresponding to the intensity of the first regulation current sensed in operation S141.

A process of operation S130 and a process of operation S140 may not be affected by each other. The first control signal and the second control signal may be independently generated. Thus, an execution order of operation S130 and operation S140 is exchangable. Alternatively, operation S130 and operation S140 may be performed simultaneously.

In operation S150, a second driving signal (e.g., DS2) may be generated. The second driving signal may be generated based on the first control signal generated in step S130 and the second control signal generated in step S140. In particular, in an exemplary embodiment of the present inventive concept, a voltage corresponding to the first control signal used to generate the second driving signal may have a voltage value limited below a threshold value.

In operation S160, a second regulation current (e.g., Irg) may be generated. The second regulation current may be generated based on the input voltage and the second driving signal generated in step S150. The second regulation current may have a waveform shown in FIG. 3. As described with reference to FIGS. 9 to 11, the intensity of the second regulation current may not increase because the voltage corresponding to the first control signal has the voltage value limited below the threshold value.

In operation S170, an output voltage (e.g., Vout) and an output current (e.g., Iout) may be outputted. In an exemplary embodiment of the present inventive concept, the output voltage may be regulated based on the regulation reference voltage. The output current may be generated based on the second regulation current. As described with reference to FIGS. 9 to 11, even though a voltage value of the output voltage decreases below a regulated voltage value, the voltage value of the voltage corresponding to the first control signal may be limited below the threshold value, to thereby stably output the output current.

Figure 13:
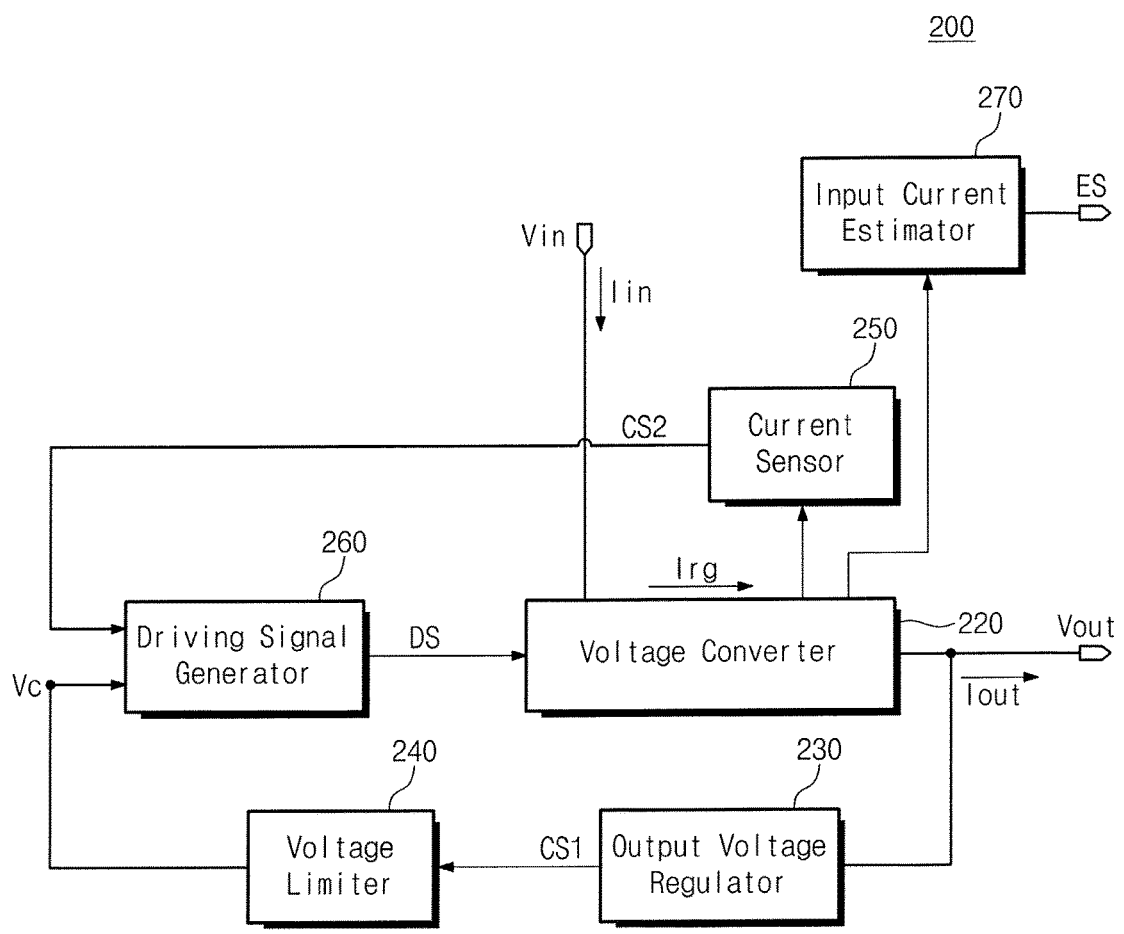
FIG. 13 is a block diagram illustrating a DC-DC converting circuit according to an exemplary embodiment of the present inventive concept.

FIG. 13 is a block diagram illustrating a DC-DC converting circuit 200 according to an exemplary embodiment of the present inventive concept. Referring to FIG. 13, the DC-DC converting circuit 200 may include a voltage converter 220, an output voltage regulator 230, a voltage limiter 240, a current sensor 250, a driving signal generator 260, and an input current estimator 270. The DC-DC converting circuit 200 may receive an input voltage Vin, and may output an output voltage Vout and an output current Iout.

Configurations and functions of the voltage converter 220, the output voltage regulator 230, the voltage limiter 240, the current sensor 250, and the driving signal generator 260 may be similar to those of the voltage converter 120, the output voltage regulator 130, the voltage limiter 140, the current sensor 150, and the driving signal generator 160, respectively, described with reference to FIGS. 1 to 9, and thus, redundant descriptions thereof may be omitted.

The input current estimator 270 may estimate the intensity of an input current Iin. The input current Iin may be generated based on the input voltage Vin. As described with reference to FIG. 3, a regulation current Irg may include first current components of first intervals where a current value increases and second current components of second intervals where a current value decreases. In an exemplary embodiment of the present inventive concept, the input current estimator 270 may estimate the intensity of the input current Iin by using the first current components included in the regulation current Irg. The input current estimator 270 may generate an estimation signal ES as the estimation result. A process of estimating the intensity of the input current Iin will be described in more detail with reference to FIG. 14.

In the DC-DC converting circuit 200, the output current Iout may be generated based on the regulation current Irg. The regulation current Irg may be generated based on the input current Iin. Thus, to output the output current Iout having a desired intensity, the intensity of the input current Iin is estimated.

In an exemplary embodiment of the present inventive concept, a threshold value for limiting a voltage corresponding to a first control signal CS1 may be adjustable. As described with reference to FIG. 9, the output current Iout may be stably outputted by limiting the voltage corresponding to the first control signal CS1. In other words, the threshold value may be adjusted to obtain the stable output current Iout. In an exemplary embodiment of the present inventive concept, the threshold value may be adjusted based on the estimation result of the input current estimator 270.

In an exemplary embodiment of the present inventive concept, the output voltage regulator 230 may regulate the output voltage Vout by using a regulation reference voltage. In this case, a voltage value of the regulation reference value may be adjustable. To obtain the output voltage Vout having a desired voltage value, the regulation reference voltage may be adjusted.

In FIG. 13, the input current estimator 270 is separately provided from the current sensor 250. However, the present inventive concept is not limited thereto. For instance, the input current estimator 270 and the current sensor 250 may be implemented by a single component. This is so because both of the input current estimator 270 and the current sensor 250 are able to perform their own functions based on the regulation current Irg. It is to be further understood that the DC-DC converting circuit 200 can just include functions for sensing the intensity of the regulation current Irg and estimating the intensity of the input current Iin.

Figure 14:
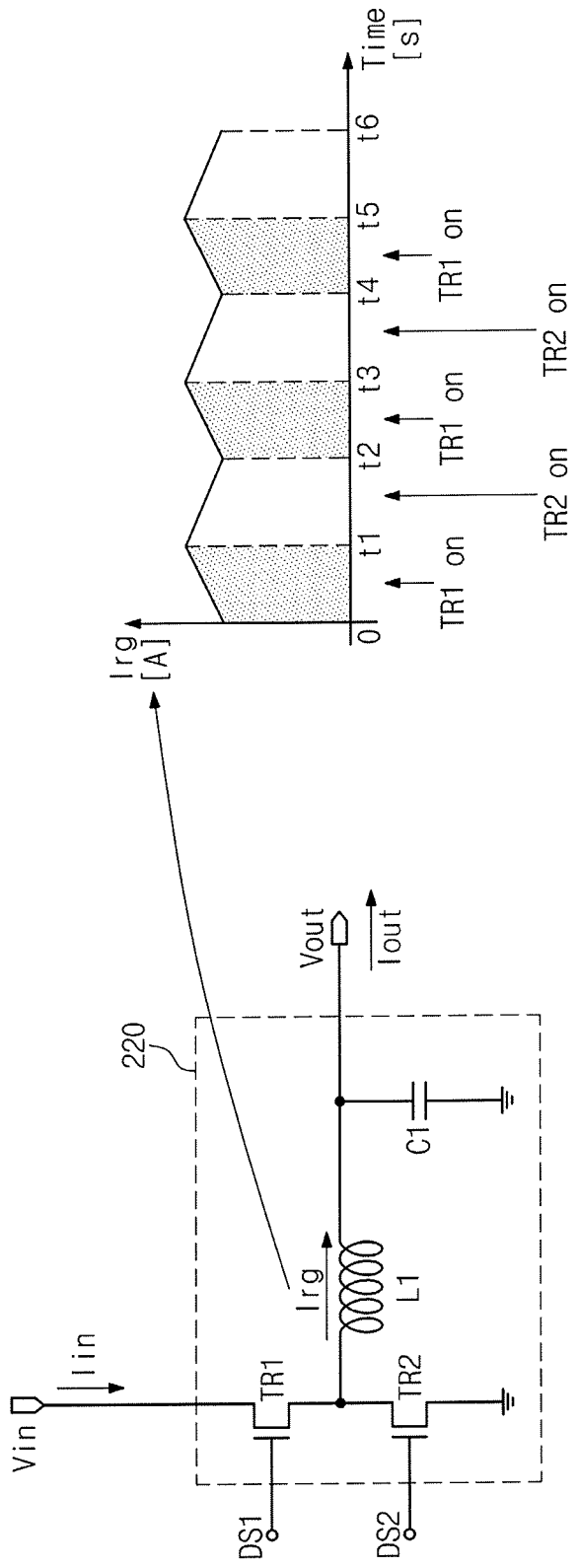
FIG. 14 is a diagram for describing a process of estimating the intensity of an input current according to an exemplary embodiment of the present inventive concept.

FIG. 14 is a diagram for describing a process of estimating the intensity of an input current Iin according to an exemplary embodiment of the present inventive concept.

As described above with reference to FIG. 3, a regulation current Irg may include first current components of first intervals (e.g., intervals from 0 to t1, from t2 to t3, and from t4 to t5) where a current value increases and second current components of second intervals (e.g., from t1 to t2, from t3 to t4, and from t5 to t6) where a current value decreases. Referring to FIG. 14, when a first transistor TR1 is turned on and a second transistor TR2 is turned off, an input current Iin may be transferred to an inductive element L1 through the first transistor TR1. Thus, the first current components may be obtained. On the other hand, when the first transistor TR1 is turned off and the second transistor TR2 is turned on, the input current Iin may not be transferred to the inductive element L1. Thus, the second current components may be obtained.

In other words, the input current Iin may affect the first current components included in the regulation current Irg. Accordingly, when the first current components of the first intervals where a current value increases are extracted, a characteristic of the input current Iin may be estimated based on the extracted first current components. For instance, the intensity of the input current Iin may be estimated based on the intensities of the first current components. A configuration of a circuit for estimating the intensity of the input current Iin will be described in more detail with reference to FIGS. 17 and 19.

According to an exemplary embodiment of the present inventive concept, the intensity of the input current Iin may be estimated relatively exactly, without directly measuring the intensity of the input current Iin. Further, the intensity of the input current Iin may be monitored in real time, while the DC-DC converting circuit 200 (refer to FIG. 13) is operating. According to an exemplary embodiment of the present inventive concept, it is possible to control a chip, a device, or a system including the DC-DC converting circuit 200 with precision.

Figure 15:
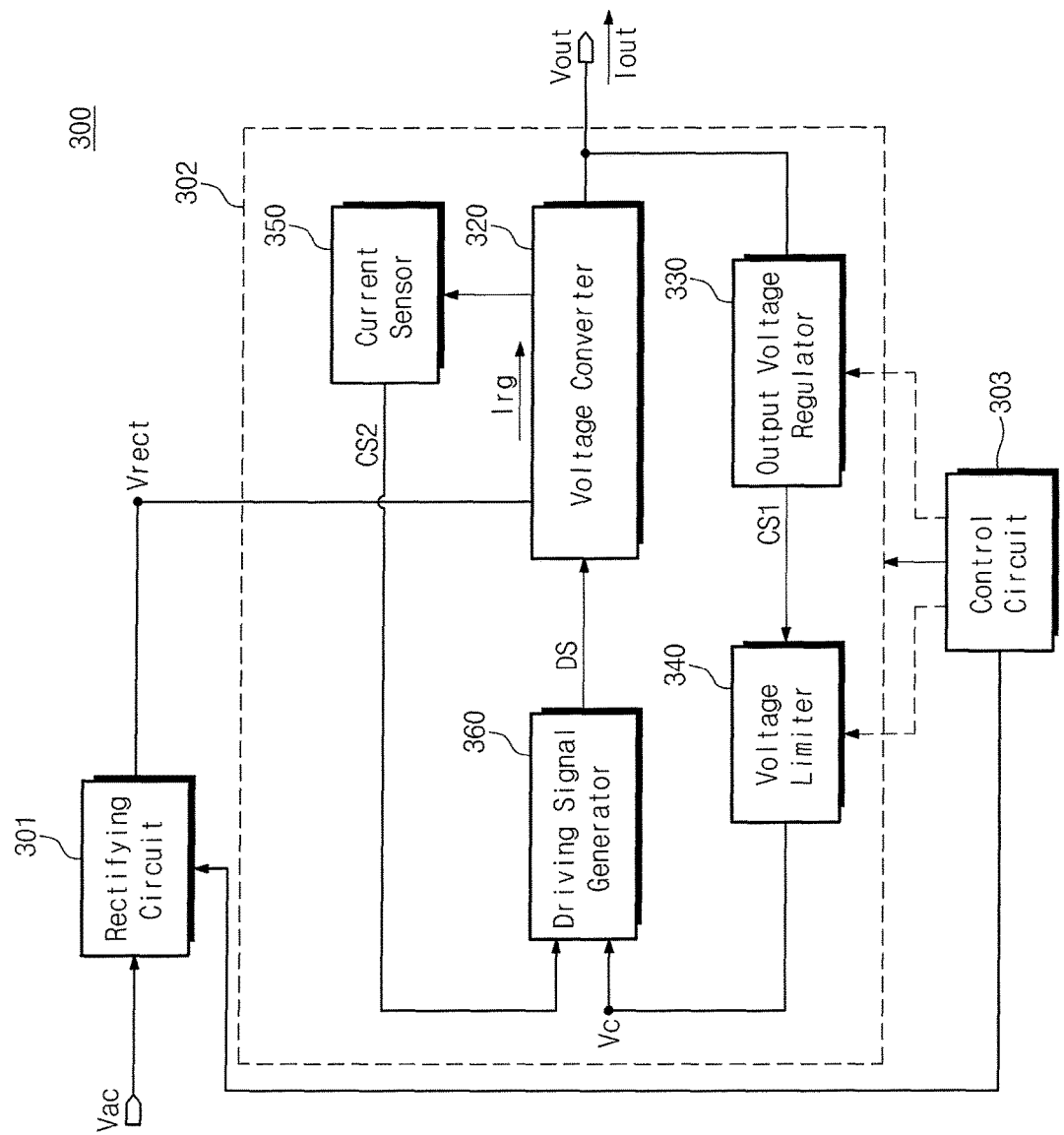
FIG. 15 is a block diagram illustrating a power management chip package according to an exemplary embodiment of the present inventive concept.

FIG. 15 is a block diagram illustrating a power management chip package 300 according to an exemplary embodiment of the present inventive concept. Referring to FIG. 15, the power management chip package 300 may include a rectifying circuit 301, a DC-DC converting circuit 302, and a control circuit 303. However, the power management chip package 300 may further comprise a variety of other components other than the components shown in FIG. 15. In an exemplary embodiment of the present inventive concept, the power management chip package 300 may be a semiconductor chip package for managing a wireless power transferring operation.

The rectifying circuit 301 may receive an alternating current (AC) voltage Vac. The AC voltage Vac may be provided from a transmitter for transmitting a wireless power. In an exemplary embodiment of the present inventive concept, the AC voltage Vac may be transmitted by resonance of inductive elements. The rectifying circuit 301 may rectify the AC voltage Vac to generate a rectified voltage Vrect.

The DC-DC converting circuit 302 may receive the rectified voltage Vrect as an input voltage Vin (refer to FIG. 1). The DC-DC converting circuit 302 may output an output voltage Vout and an output current Iout. In an exemplary embodiment of the present inventive concept, the DC-DC converting circuit 302 may include a voltage converter 320, an output voltage regulator 330, a voltage limiter 340, a current sensor 350, and a driving signal generator 360.

Configurations and functions of the voltage converter 320, the output voltage regulator 330, the voltage limiter 340, the current sensor 350, and the driving signal generator 360 may be similar to those of the voltage converter 120, the output voltage regulator 130, the voltage limiter 140, the current sensor 150, and the driving signal generator 160, respectively, described with reference to FIGS. 1 through 9, and thus, redundant descriptions thereof may be omitted.

When the voltage limiter 340 is included in the DC-DC converting circuit 302, a voltage value Vc of a voltage corresponding to a first control signal CS1 may be limited below a threshold value. Operations of the voltage limiter 340 have been described with reference to FIGS. 9 to 11. Accordingly, the output current Iout may be stably outputted.

The control circuit 303 may control operations of the rectifying circuit 301 and the DC-DC converting circuit 302. For instance, the control circuit 303 may be a micro controller unit (MCU).

In an exemplary embodiment of the inventive concept, the threshold value may be adjusted to limit the voltage corresponding to the first control signal CS1. To adjust the threshold value, the control circuit 303 may adjust a limiting reference voltage Vlim (refer to FIG. 9) used by the voltage limiter 340. Thus, a stable output current Iout may be obtained.

In an exemplary embodiment of the present inventive concept, the control circuit 303 may adjust a voltage value of a regulation reference voltage used to regulate the output voltage Vout. Thus, the output voltage Vout having a desired voltage value may be obtained. The control circuit 303 may further control the overall operation of the rectifying circuit 301, the DC-DC converting circuit 302, and any other components of the power management chip package 300.

Figure 16:
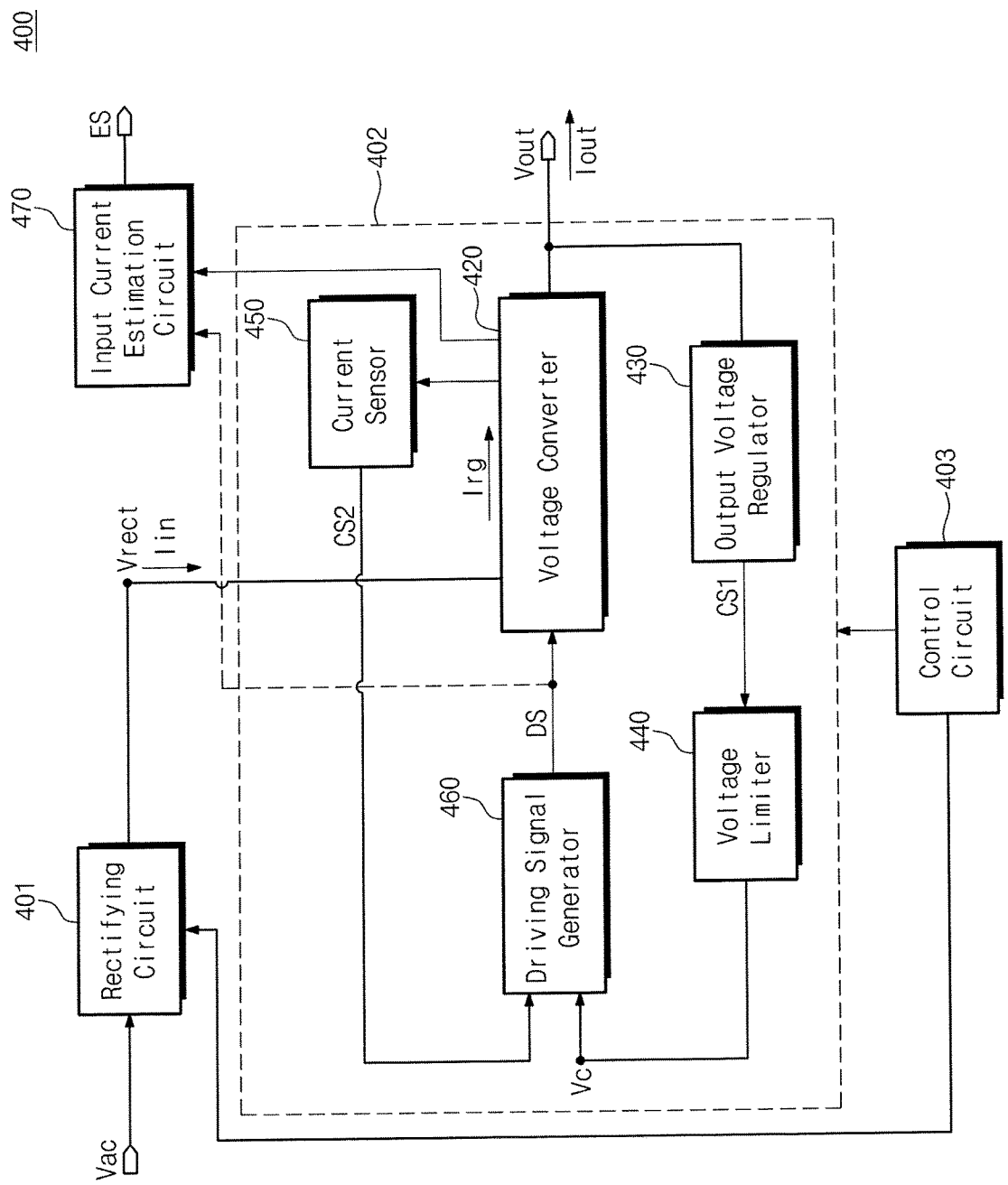
FIG. 16 is a block diagram illustrating a power management chip package according to an exemplary embodiment of the present inventive concept.

FIG. 16 is a block diagram illustrating a power management chip package 400 according to an exemplary embodiment of the present inventive concept. Referring to FIG. 16, the power management chip package 400 may include a rectifying circuit 401, a DC-DC converting circuit 402, a control circuit 403, and an input current estimation circuit 470. However, the power management chip package 400 may comprise other components than the components shown in FIG. 16. In an exemplary embodiment of the present inventive concept, the power management chip package 400 may be a semiconductor chip package for managing a wireless power transferring operation.

Configurations and functions of the rectifying circuit 401, the control circuit 403, the voltage converter 420, the output voltage regulator 430, the voltage limiter 440, the current sensor 450, and the driving signal generator 460 may be the same as those of the rectifying circuit 301, the control circuit 303, the voltage converter 320, the output voltage regulator 330, the voltage limiter 340, the current sensor 350, and the driving signal generator 360, respectively, described with reference to FIG. 15, and thus, redundant descriptions thereof may be omitted.

The input current estimation circuit 470 may estimate the intensity of an input current Iin. The input current Iin may be generated based on a rectified voltage Vrect. As described with reference to FIG. 3, a regulation current Irg may include first current components of first intervals where a current value increases and second current components of second intervals where a current value decreases. In an exemplary embodiment of the present inventive concept, the input current estimation circuit 470 may estimate the intensity of the input current Iin by using the first current components included in the regulation current Irg.

In an exemplary embodiment of the present inventive concept, the input current estimation circuit 470 may use a driving signal DS to estimate the intensity of the input current Iin. This will be described in more detail with reference to FIG. 17. In an exemplary embodiment of the present inventive concept, the input current estimation circuit 470 may generate an estimation signal ES, which corresponds to the estimation result. A process of estimating the intensity of the input current Iin has been described with reference to FIG. 14.

In FIG. 16, the input current estimation circuit 470 is separately provided from the DC-DC converting circuit 402. However, the present inventive concept is not limited thereto. For instance, the input current estimation circuit 470 and the DC-DC converting circuit 402 may be implemented by a single component. In this instance, when the input current estimation circuit 470 is included in the DC-DC converting circuit 402, the input current estimation circuit 470 may be implemented together with the current sensor 450 or may be separately provided from the current sensor 450. It is to be understood that the power management chip package 400 may just include functions for estimating the intensity of the input current Iin.

According to an exemplary embodiment of the present inventive concept, the intensity of the input current Iin may be estimated relatively exactly, without directly measuring the intensity of the input current Iin. In particular, the intensity of the input current Iin may be monitored in real time while the power management chip package 400 is operating. According to an exemplary embodiment of the present inventive concept, it is possible to control a chip, a device, or a system including the power management chip package 400 with precision.

Figure 17:
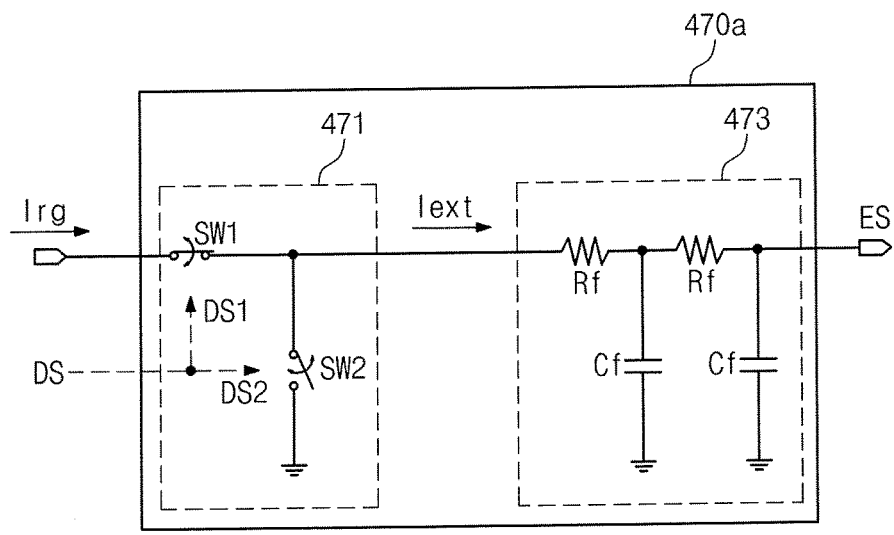
FIG. 17 is a diagram illustrating an input current estimation circuit shown in FIG. 16, according to an exemplary embodiment of the present inventive concept.

FIG. 17 is a diagram illustrating an input current estimation circuit 470 shown in FIG. 16, according to an exemplary embodiment of the present inventive concept. Referring to FIG. 17, an input current estimation circuit 470a may include a current component extractor 471 and an estimation signal generator 473. In an exemplary embodiment of the present inventive concept, the input current estimation circuit 470 shown in FIG. 16 may include the input current estimation circuit 470a shown in FIG. 17.

The current component extractor 471 may receive a regulation current Irg. In an exemplary embodiment of the present inventive concept, the current component extractor 471 may further receive a driving signal DS. In an exemplary embodiment of the present inventive concept, the current component extractor 471 may include a first switch SW1 and a second switch SW2.

In this case, the first switch SW1 may operate in response to a first driving signal DS1 included in the driving signal DS. For instance, when a first transistor TR1 (refer to FIG. 2) of a driving signal generator 460 (refer to FIG. 16) is turned on by the first driving signal DS1, the first switch SW1 may be connected by the first driving signal DS1. On the other hand, when the first transistor TR1 of the driving signal generator 460 is turned off by the first driving signal DS1, the first switch SW1 may be disconnected by the first driving signal DS1. In other words, the operations of the first switch SW1 may correspond to the operations of the first transistor TR1. Further, the second switch SW2 may operate in response to a second driving signal DS2 included in the driving signal DS. The operations of the second switch SW2 may correspond to the operations of a second transistor TR2 (refer to FIG. 2) of the driving signal generator 460. In this case, the first switch SW1 and the second switch SW2 are connected in turn, in response to the first driving signal DS1 and the second driving signal DS2, respectively.

When the first switch SW1 is connected and the second switch SW2 is disconnected, the current component extractor 471 may output first current components of first intervals where a current value increases included in the regulation current Irg. On the other hand, when the first switch SW1 is disconnected and the second switch SW2 is connected, the current component extractor 471 may not output a current. In other words, second current components of second intervals where a current value decreases included in the regulation current Irg may not be outputted. Accordingly, the current component extractor 471 may extract first current components included in the regulation current Irg.

In short, the current component extractor 471 may output the extracted current components Iext (e.g., the first current components) according to the driving signal DS. As described with reference to FIGS. 13 and 14, an input current Iin (refer to FIG. 16) affects the first current components of the first intervals where a current value increases. Thus, the extracted current components Iext may be used to estimate the intensity of the input current Iin.

The estimation signal generator 473 may receive the extracted current components Iext. The estimation signal generator 473 may generate an estimation signal ES based on the extracted current components Iext. In an exemplary embodiment of the inventive concept, the estimation signal generator 473 may include filter resistors Rf and filter capacitors Cf. In this case, an average level component of the extracted current components Iext may be selected by the filter resistors Rf and the filter capacitors Cf. As a result, the estimation signal ES may include information corresponding to the estimated average intensity of the input current Iin. Thus, the intensity of the input current Iin may be estimated referring to the estimation signal ES.

In FIG. 17, switches, resistors, and capacitors are included in the input current estimation circuit 470a. However, the present inventive concept is not limited thereto. For instance, the first switch SW1, the second switch SW2, the filter resistors Rf, and the filter capacitors Cf may be replaced with any other elements having functions and characteristics of a switch, a resistor, and a capacitor.

Figure 18:
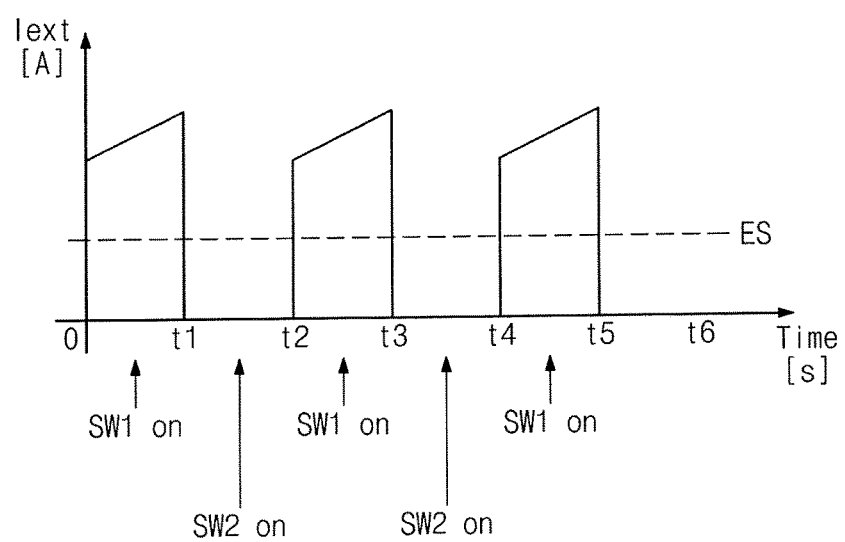
FIG. 18 is a diagram for describing a process of estimating the intensity of an input current with an input current estimation circuit shown in FIG. 17, according to an exemplary embodiment of the present inventive concept.

FIG. 18 is a diagram for describing a process of estimating the intensity of an input current Iin (refer to FIG. 16) with an input current estimation circuit 470a shown in FIG. 17, according to an exemplary embodiment of the present inventive concept.

During time intervals (e.g., intervals from 0 to t1, from t2 to t3, and from t4 to t5) where a first switch SW1 (refer to FIG. 17) is connected and a second switch SW2 (refer to FIG. 17) is disconnected, a current component extractor 471 (refer to FIG. 17) may extract first current components of which a current value increases from a regulation current Irg (refer to FIG. 17). On the other hand, during time intervals (e.g., intervals from t1 to t2, from t3 to t4, and from t5 to t6) where the first switch SW1 is disconnected and the second switch SW2 is connected, the current component extractor 471 may not extract a current component. Accordingly, the extracted current components Iext may have a waveform shown in FIG. 18.

An estimation signal generator 473 (refer to FIG. 17) may select an average level component of the extracted current components Iext. The estimation signal generator 473 may generate an estimation signal ES based on the selected average level component. In other words, the estimation signal ES may include information corresponding to the estimated average intensity of an input current Iin (refer to FIG. 16).

However, the extracted current components Iext may not include current components corresponding to the time intervals where the second switch SW2 is connected. Thus, the intensity of the average level component selected by the estimation signal generator 473 may be smaller than an actual average intensity. In other words, since information included in the estimation signal ES of FIG. 17 may not be precise, the intensity of the average level component selected by the estimation signal generator 473 may be scaled.

Figure 19:
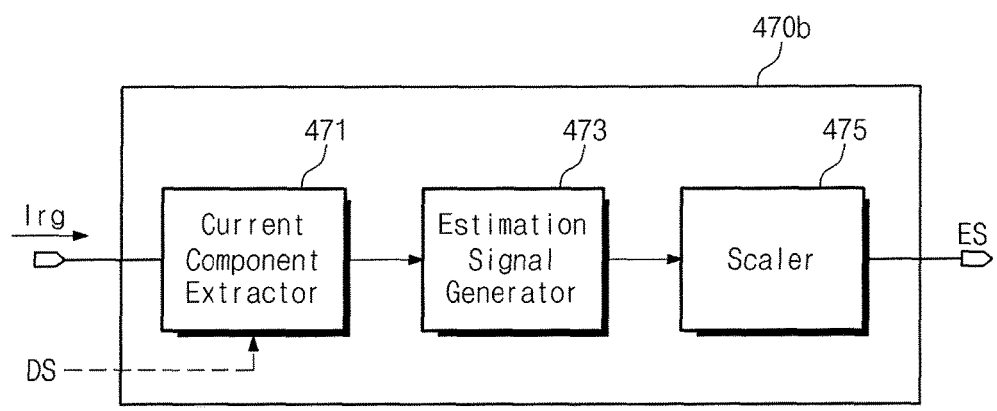
FIG. 19 is a diagram illustrating an input current estimation circuit shown in FIG. 16, according to an exemplary embodiment of the present inventive concept.

FIG. 19 is a diagram illustrating an input current estimation circuit 470 shown in FIG. 16, according to an exemplary embodiment of the present inventive concept. Referring to FIG. 19, an input current estimation circuit 470b may include a current component extractor 471, an estimation signal generator 473, and a scaler 475. In an exemplary embodiment of the present inventive concept, the input current estimation circuit 470 of FIG. 16 may include the input current estimation circuit 470b shown in FIG. 19.

The current component extractor 471 and the estimation signal generator 473 may be similar to those described with reference to FIGS. 17 and 18, and thus, redundant descriptions thereof may be omitted.

The scaler 475 may adjust the amplitude of an estimated average intensity of an input current Iin (refer to FIG. 16). As described with reference to FIG. 18, the intensity of an average level component selected by the estimation signal generator 473 may be smaller than an actual average intensity of the input current Iin. Thus, the scaler 475 may be used to obtain more precise information corresponding to the estimated average intensity of the input current Iin. The amount of scaling by the scaler 475 and the amplitude of the estimated average intensity of the input current Iin may vary.

Figure 20:
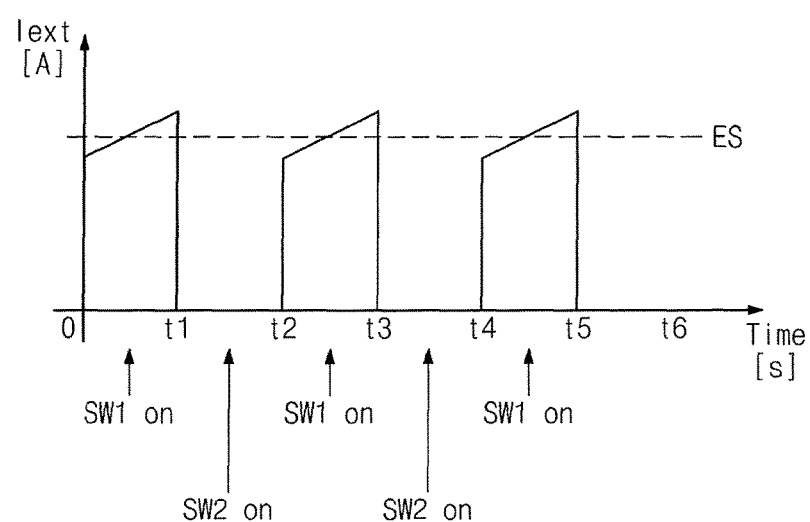
FIG. 20 is a diagram for describing a process of estimating the intensity of an input current with an input current estimation circuit shown in FIG. 19, according to an exemplary embodiment of the present inventive concept.

FIG. 20 is a diagram for describing a process of estimating the intensity of an input current Iin (refer to FIG. 16) with an input current estimation circuit 470b shown in FIG. 19, according to an exemplary embodiment of the present inventive concept. Elements shown in FIG. 20 correspond to those of FIG. 18, and thus, may not be described again.

A scaler 475 (refer to FIG. 19) may adjust the amplitude of an estimated average intensity of the input current Iin. In other words, the amplitude of an average level component selected by an estimation signal generator 473 (refer to FIG. 19) may be adjusted. Accordingly, an estimated intensity which is approximate to an actual average intensity of the input current Iin may be obtained. Further, an estimation signal ES may include more precise information.

It is to be understood that the present inventive concept is not limited to configurations and functions of input current estimation circuits 470a and 470b described with reference to FIGS. 17 to 20. For example, an input current estimation circuit 470 (refer to FIG. 16) may be configured to be different from the input current estimation circuits 470a and 470b described with reference to FIGS. 17 and 19, and the input current Iin may be estimated by other processes different from those described with reference to FIGS. 17 to 20.

FIG. 21 is a block diagram illustrating a receiver Rx of a power transferring system 1000 including a DC-DC converting circuit 1130 according to an exemplary embodiment of the present inventive concept. Referring to FIG. 21, the receiver Rx of the power transferring system 1000 may include a power management chip package 1100, a battery 1155, and a radio frequency (RF)/digital circuit block 1199. The power management chip package 1100 may include a rectifying circuit 1110, a DC-DC converting circuit 1130, a high-voltage linear regulator 1150, and a low-dropout (LDO) regulator 1170, and an MCU 1190. In an exemplary embodiment of the present inventive concept, the power transferring system 1000 may operate in compliance with a wireless power transferring operation. In an exemplary embodiment of the present inventive concept, the power transferring system 1000 may be a wireless charging system using resonance of inductive elements.

The rectifying circuit 1110 may receive an AC voltage Vac. The AC voltage Vac may be provided from a transmitter Tx of the power transferring system 1000. The rectifying circuit 1110 may rectify the AC voltage Vac to generate a rectified voltage Vrect.

The DC-DC converting circuit 1130 may receive the rectified voltage Vrect. The DC-DC converting circuit 1130 may output an output voltage Vout and an output current Iout. The DC-DC converting circuit 1130 may be one of the DC-DC converting circuits according to an exemplary embodiment of the present inventive concept. In this case, the DC-DC converting circuit 1130 may include a voltage limiter (140, refer to FIG. 1) for limiting a voltage corresponding to a control signal. Further, in this case, the DC-DC converting circuit 1130 may include an input current estimator (270, refer to FIG. 13) for estimating the intensity of an input current.

When the DC-DC converting circuit 1130 is one of the DC-DC converting circuits according to an exemplary embodiment of the present inventive concept, the DC-DC converting circuit 1130 may perform various functions. Thus, the DC-DC converting circuit 1130 may be solely provided without an additional converting circuit (e.g., a charger circuit for charging the battery 1155). In an exemplary embodiment of the present inventive concept, the battery 1155 may be charged by using the output voltage Vout and the output current Iout outputted from the DC-DC converting circuit 1130. In this case, a separate charger circuit is not used. Further, the DC-DC converting circuit 1130 may generate and/or provide a voltage and a current to be used in other chips, devices, or systems.

The high-voltage linear regulator 1150 may receive the rectified voltage Vrect. The high-voltage linear regulator 1150 may generate a first operation voltage Vop1 for operating the DC-DC converting circuit 1130 based on the rectified voltage Vrect. Further, the high-voltage linear regulator 1150 may generate a second operation voltage Vop2 for operating the LDO regulator 1170 based on the rectified voltage Vrect.

The power management chip package 1100 does not receive a power from the battery 1155. Thus, a power supply circuit for operating the power management chip package 1100 may be provided. The high-voltage linear regulator 1150 may act as the power supply circuit for operating the power management chip package 1100. In particular, the high-voltage linear regulator 1150 may convert the rectified voltage Vrect having a fluctuating value into the first operation voltage Vop1 and the second operation voltage Vop2 having relatively stable values.

The LDO regulator 1170 may operate by using the second operation voltage Vop2 generated by the high-voltage linear regulator 1150. The LDO regulator 1170 may generate a voltage to be used in another circuit, chip, device, or system. In particular, the LDO regulator 1170 may output a drop voltage Vdrp, based on the second operation voltage Vop2. The drop voltage Vdrp outputted from the LDO regulator 1170 may be provided to the RF/digital circuit block 1199.

The MCU 1190 may control the overall operations of components included in the power management chip package 1100. In an exemplary embodiment of the present inventive concept, the MCU 1190 may adjust a threshold value for limiting a voltage corresponding to a control signal. In an exemplary embodiment of the present inventive concept, the MCU 1190 may adjust a voltage value of a regulation reference voltage used to regulate the output voltage Vout.

The RF/digital circuit block 1199 may operate by using the drop voltage Vdrp. The RF/digital circuit block 1199 may transmit a voltage control signal V_CON to the transmitter Tx of the power supply system 1000. The voltage control signal V_CON will be described in more detail with reference to FIG. 22.

Figure 22:
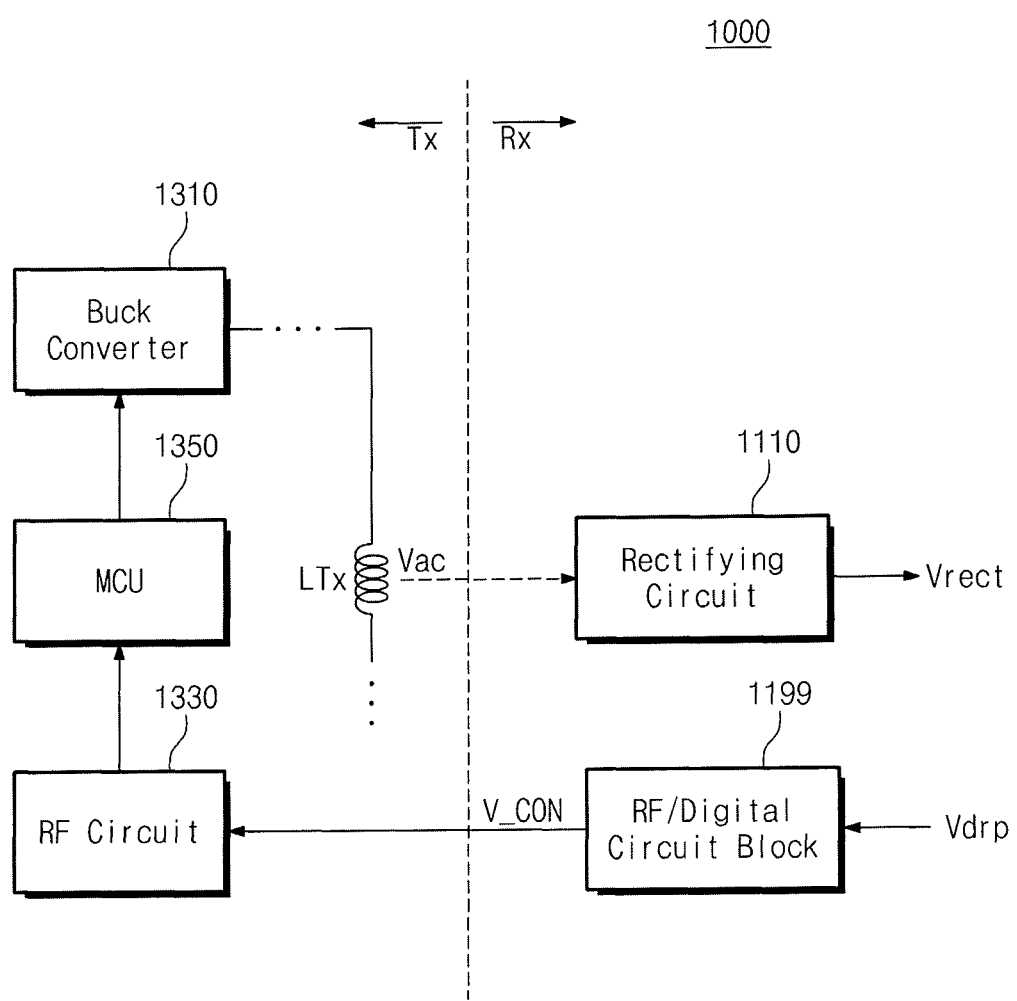
FIG. 22 is a block diagram illustrating a transmitter and a receiver of a power transferring system including a DC-DC converting circuit according to an exemplary embodiment of the present inventive concept.

FIG. 22 is a block diagram illustrating a transmitter Tx and a receiver Rx of a power transferring system 1000 including a DC-DC converting circuit according to an exemplary embodiment of the present inventive concept. Referring to FIG. 22, the transmitter Tx of the power transferring system 1000 may include a buck converter 1310, an RF circuit 1330, an MCU 1350, and a transmission inductor LTx. The receiver Rx of the power transferring system 1000 shown in FIG. 22 only includes a rectifying circuit 1110 and an RF/digital circuit block 1199. However, each of the transmitter Tx and the receiver Rx of the power transferring system 1000 may further include other components than the components shown in FIG. 22. Like the power transferring system 1000 of FIG. 21, the power transferring system 1000 of FIG. 22 may be a wireless charging system using resonance of inductive elements.

The buck converter 1310 may transfer power to the transmission inductor LTx. The rectifying circuit 1110 may receive an AC voltage Vac by resonance between the transmission inductor LTx and an inductive element in the rectifying circuit 1110. The receiver Rx of the power transferring system 1000 may operate by using the AC voltage Vac provided through the transmission inductor LTx.

The RF/digital circuit block 1199 may operate by using a drop voltage Vdrp. The RF/digital circuit block 1199 may transmit a voltage control signal V_CON to the RF circuit 1330 of the transmitter Tx. In an exemplary embodiment of the present inventive concept, the RF/digital circuit block 1199 may communicate with the RF circuit 1330 in compliance with a wireless communication protocol such as, but not limited to, Bluetooth, near field communication (NFC), and so on.

The voltage control signal V_CON is a signal which is used to control the amplitude of the AC voltage Vac provided to the rectifying circuit 1110. In an exemplary embodiment of the present inventive concept, the voltage control signal V_CON may include information associated with the intensity of an output current Iout (refer to FIG. 21) outputted from a DC-DC converting circuit 1130 (refer to FIG. 21) of the receiver Rx and information associated with the intensity of an input current estimated by the DC-DC converting circuit 1130. Electric signals provided to components included in the receiver Rx of the power transferring system 1000 may be managed by controlling the amplitude of the AC voltage Vac based on information included in the voltage control signal V_CON.

The voltage control signal V_CON may be provided to the MCU 1350 through the RF circuit 1330. The MCU 1350 may control the buck converter 1310 based on the voltage control signal V_CON. The buck converter 1310 may adjust power to be transferred to the transmission inductor LTx according to a control of the MCU 1350. Thus, the amplitude of the AC voltage Vac provided to the rectifying circuit 1110 may be controlled. The rectifying circuit 1110 may rectify the AC voltage Vac to generate a rectified voltage Vrect.

Figure 23:
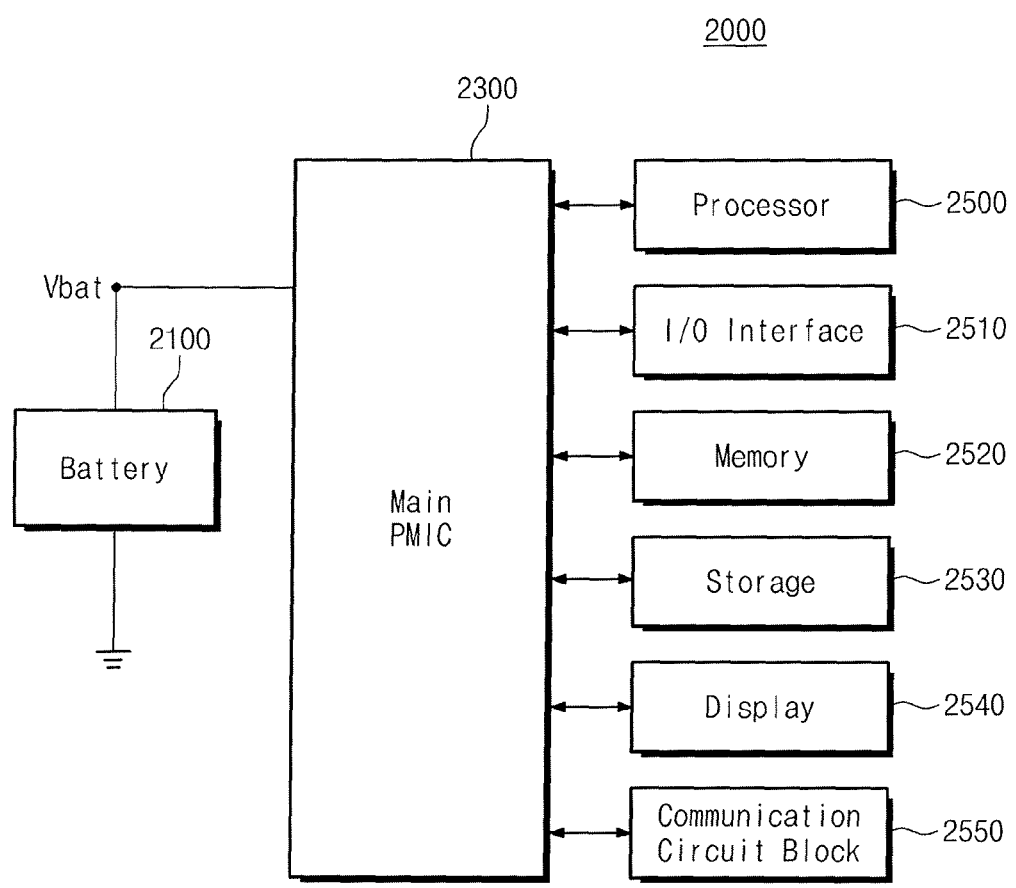
FIG. 23 is a block diagram illustrating a power management system of a mobile electronic device employing a power transferring system shown in FIG. 22, according to an exemplary embodiment of the present inventive concept.

FIG. 23 is a block diagram illustrating a power management system 2000 of a mobile electronic device including a power transferring system 1000 shown in FIG. 22, according to an exemplary embodiment of the present inventive concept. Referring to FIG. 23, the power management system 2000 may include a battery 2100, a main power management integrated circuit (PMIC) 2300, a processor 2500, an input/output interface 2510, a memory 2520, a storage 2530, a display 2540, and a communication circuit block 2550. In an exemplary embodiment of the present inventive concept, the mobile electronic device including the power management system 2000 may be one of a mobile phone, a tablet, a wearable device, and so on. In this case, the processor 2500 may include an application processor.

In an exemplary embodiment of the present inventive concept, the battery 2100 may be charged by using an output voltage Vout (refer to FIG. 21) and an output current Iout (refer to FIG. 21). When being connected to the mobile electronic device after charging, the battery 2100 may output a battery voltage Vbat. The battery voltage Vbat may be provided to the main PMIC 2300. The main PMIC 2300 may convert the battery voltage Vbat provided from the battery 2100 into a stabilized voltage. The main PMIC 2300 may provide the stabilized voltage to other components. Each of the processor 2500, the input/output interface 2510, the memory 2520, the storage 2530, the display 2540, and the communication circuit block 2550 may operate by using the stabilized voltage provided from the main PMIC 2300.

It is to be understood that the power management system 2000 and the mobile electronic device including the same may further include other components than the components shown in FIG. 23. For example, the power management system 2000 and the mobile electronic device including the same may not include at least one of the components shown in FIG. 23.

Figure 24:
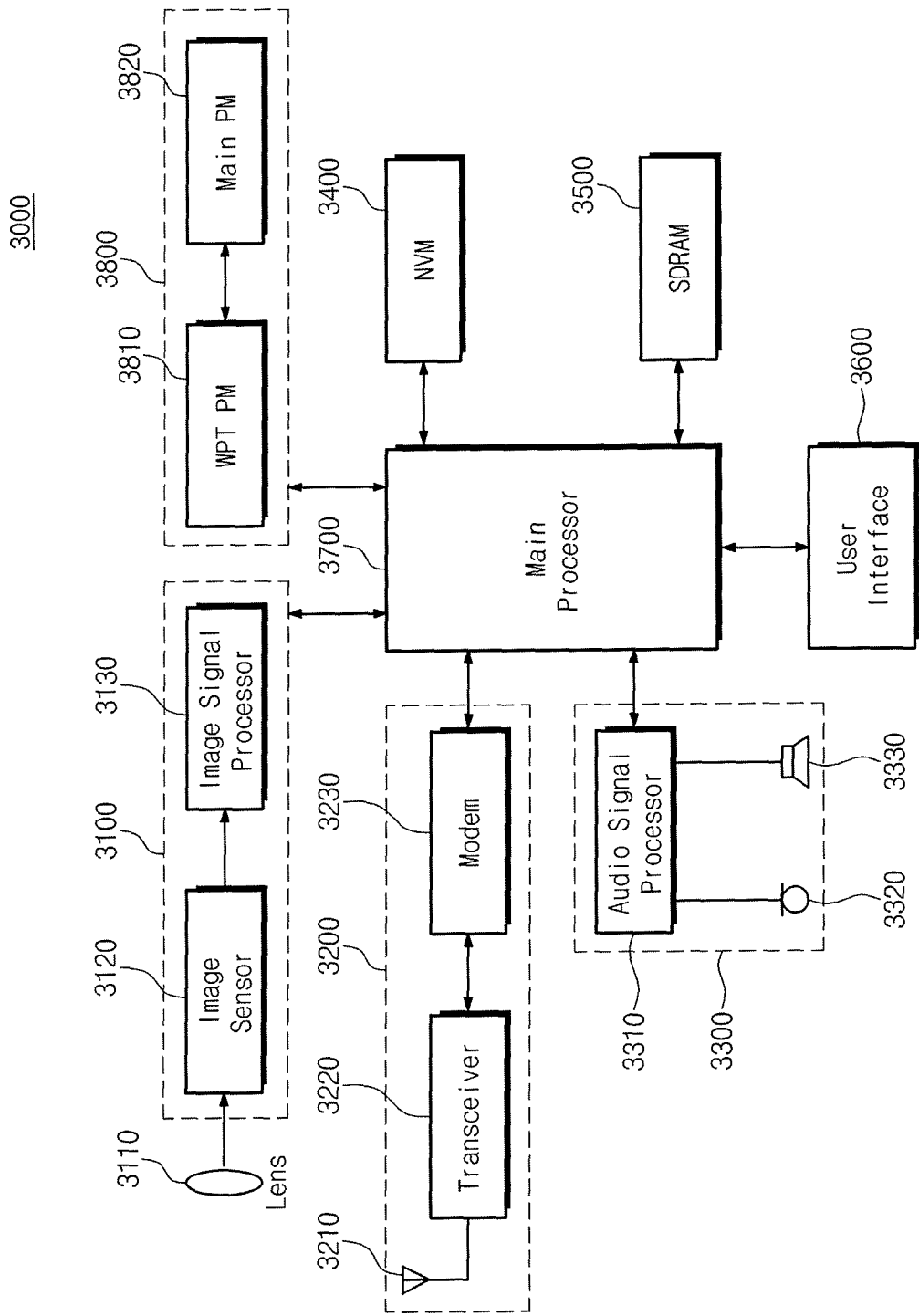
FIG. 24 is a block diagram illustrating a mobile device including a wireless power transferring manager according to an exemplary embodiment of the present inventive concept.

FIG. 24 is a block diagram illustrating a mobile device 3000 including a wireless power transferring manager 3810 according to an exemplary embodiment of the present inventive concept. Referring to FIG. 24, the mobile device 3000 may include an image processing block 3100, a wireless communication block 3200, an audio processing block 3300, a nonvolatile memory 3400, a synchronous dynamic random access memory (SDRAM) 3500, a user interface 3600, a main processor 3700, and a power management block 3800. In an exemplary embodiment of the present inventive concept, the mobile device 3000 may be a mobile terminal, a personal digital assistant (PDA), a personal media player (PMP), a digital camera, a smartphone, or a tablet.

The image processing block 3100 may receive light through a lens 3110. An image sensor 3120 and an image signal processor 3130 included in the image processing block 3100 may generate one or more images by using the received light.

The wireless communication block 3200 may include an antenna 3210, a transceiver 3220, and a modem 3230. The wireless communication block 3200 may communicate with the exterior of the mobile device 3000 in compliance with various wireless communication protocols, such as, but not limited to, long term evolution (LTE), world interoperability for microwave access (WiMax), global system for mobile communication (GSM), code division multiple access (CDMA), Bluetooth, NFC, WiFi, radio frequency identification (RFID), and so on.

The audio processing block 3300 may process an audio signal by using an audio signal processor 3310, a microphone 3320, and a speaker 3330. The nonvolatile memory 3400 may store data to be retained, for example, even when the mobile device 3000 is not powered. In an exemplary embodiment of the present inventive concept, the nonvolatile memory 3400 may be a NAND-type flash memory, a phase-change RAM (PRAM), a magneto-resistive RAM (MRAM), a resistive RAM (ReRAM), a ferro-electric RAM (FRAM), a NOR-type flash memory, and so on. Alternatively, the nonvolatile memory 3400 may include different types of memories. The SDRAM 3500 may temporarily store data used in operations of the mobile device 3000. The SDRAM 3500 may operate as a working memory, an operation memory, and a buffer memory of the mobile device 3000.

The user interface 3600 may interface between a user and the mobile device 3000 according to a control of the main processor 3700. For instance, the user interface 3600 may include input interfaces such as a keyboard, a keypad, a button, a touch panel, a touch screen, a touch pad, a touch ball, a camera, a microphone, a gyroscope sensor, a vibration sensor, and so on. The user interface 3600 may further include output interfaces such as a liquid crystal display (LCD), an organic light emitting diode (OLED) display, an active matrix OLED (AMOLED) display, an LED, and so on.

The main processor 3700 may control the overall operations of the mobile device 3000. The image processing block 3100, the wireless communication block 3200, the audio processing block 3300, the nonvolatile memory 3400, the SDRAM 3500, and the power management block 3800 may perform and execute a user instruction provided through the user interface 3600 according to a control of the main processor 3700. Alternatively, the image processing block 3100, the wireless communication block 3200, the audio processing block 3300, the nonvolatile memory 3400, the SDRAM 3500, and the power management block 3800 may provide various information to the user through the user interface 3600 according to a control of the main processor 3700. The main processor 3700 may be implemented by a system on chip (SoC). In an exemplary embodiment of the present inventive concept, the main processor 3700 may include an application processor.

The power management block 3800 may manage power used for the operations of the mobile device 3000. The power management block 3800 may include the wireless power transferring manager 3810 and a main power manager 3820. The wireless power transferring manager 3810 may be implemented according to an exemplary embodiment of the present inventive concept. For example, the wireless power transferring manager 3810 may include a voltage limiter 340 (refer to FIG. 15) for limiting a voltage corresponding to a control signal. In an exemplary embodiment of the present inventive concept, the wireless power transferring manager 3810 may include an input current estimation circuit 470 (refer to FIG. 16) for estimating the intensity of an input current. In an exemplary embodiment of the present inventive concept, the main power manager 3820 may be a main PMIC 2300 (refer to FIG. 23).

Figure 25:
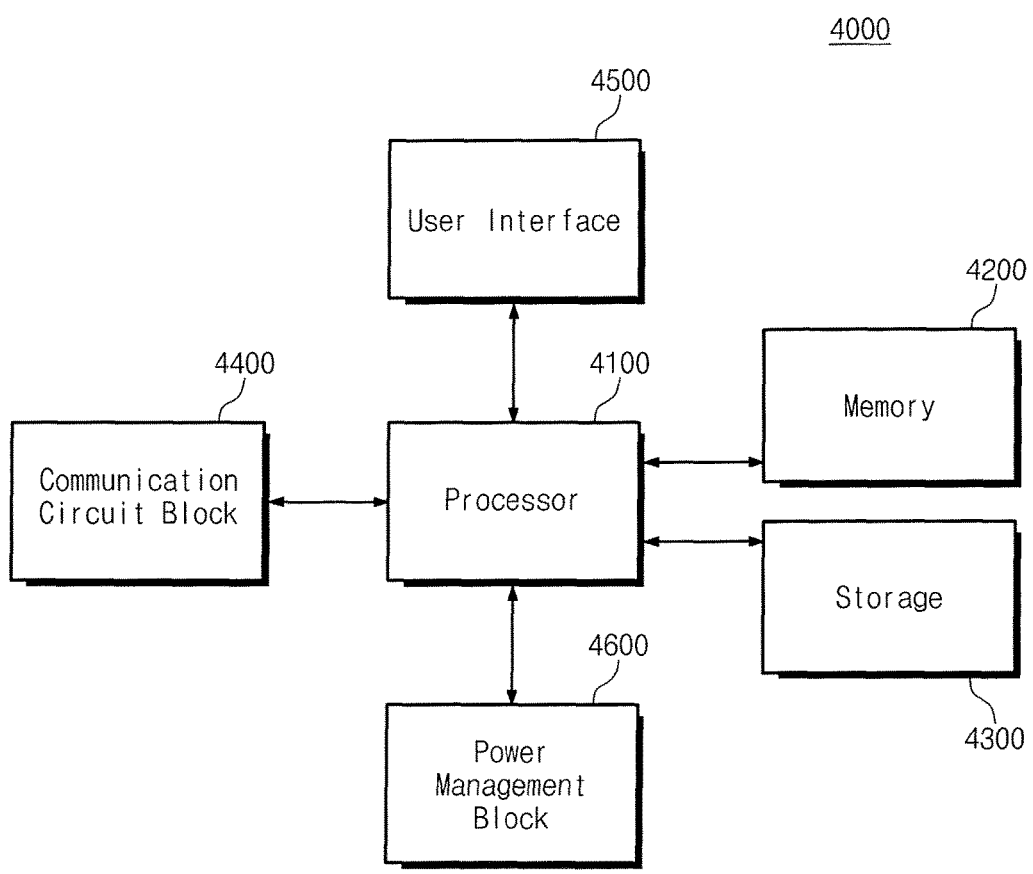
FIG. 25 is a block diagram illustrating an electronic device including a power management block according to an exemplary embodiment of the present inventive concept.

FIG. 25 is a block diagram illustrating an electronic device 4000 including a power management block 4600 according to an exemplary embodiment of the present inventive concept. Referring to FIG. 25, the electronic device 4000 may include a processor 4100, a memory 4200, a storage 4300, a communication circuit block 4400, a user interface 4500, and the power management block 4600. In an exemplary embodiment of the present inventive concept, the electronic device 4000 may be a computer, a tablet, a wearable device, and so on.

The processor 4100 may control the overall operation of the electronic device 4000. In an exemplary embodiment of the present inventive concept, the processor 4100 may include an application processor. Alternatively, the processor 4100 may be a general purpose processor or a processor for a workstation.

The memory 4200 may temporarily store data used in the operations of the electronic device 4000. The memory 4200 may exchange data with the processor 4100. The memory 4200 may operate as a working memory, an operation memory, and a buffer memory of the electronic device 4000. In an exemplary embodiment of the present inventive concept, the memory 4200 may include a volatile memory such as, but not limited to, a static RAM (SRAM), a dynamic RAM (DRAM), and a SDRAM, or a nonvolatile memory such as, but not limited to, a PRAM, an MRAM, a ReRAM, and an FRAM. The memory 4200 may include one or more memory modules or one or more memory packages.

The storage 4300 may store data to be retained, for example, even when the electronic device 4000 is not powered. In an exemplary embodiment of the present inventive concept, the storage 4300 may include a nonvolatile memory, such as, but not limited to, a flash memory, a PRAM, an MRAM, a ReRAM, and an FRAM. In an exemplary embodiment of the present inventive concept, the storage 4300 may be a memory card such as, but not limited to, an embedded multimedia card (eMMC).

The communication circuit block 4400 may communicate with the external of the electronic device 4000 according to a control of the processor 4100. The communication circuit block 4400 may communicate with the external device in compliance with a wired or wireless communication protocol. For instance, the communication circuit block 4400 may communicate with the external device, based on at least one of wireless communication protocols such as, but not limited to, LTE, WiMax, GSM, CDMA, Bluetooth, NFC, WiFi, and RFID, and wired communication protocols such as, but not limited to, universal serial bus (USB), small computer system interface (SCSI), peripheral component interconnect express (PCIe), advanced technology attachment (ATA), serial ATA (SATA), parallel ATA (PATA), serial attached SCSI (SAS), integrated drive electronics (IDE), and Firewire.

The user interface 4500 may interface between a user and the electronic device 4000 according to a control of the processor 4100. For instance, the user interface 4500 may include input interfaces such as, but not limited to, a keyboard, a keypad, a button, a touch panel, a touch screen, a touch pad, a touch ball, a camera, a microphone, a gyroscope sensor, a vibration sensor, and so on. The user interface 4500 may further include output interfaces such as, but not limited to, an LCD, an OLED display device, an AMOLED display device, an LED, a speaker, a motor, and so on.

The power management block 4600 may manage power used for the operation of the electronic device 4000. The power management block 4600 may be implemented according to an exemplary embodiment of the present inventive concept. In an exemplary embodiment of the present inventive concept, the power management block 4600 may include a voltage limiter 340 (refer to FIG. 15) for limiting a voltage corresponding to a control signal. In an exemplary embodiment of the present inventive concept, the power management block 4600 may include an input current estimation circuit 470 (refer to FIG. 16) for estimating the intensity of an input current. The power management block 4600 may also include a main PMIC 2300 (refer to FIG. 23).

Processors, memories, and circuits according to exemplary embodiments of the present inventive concept may be packaged according to any one of a variety of different packaging technologies such as, but not limited to, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), small outline integrated circuit (SOIC), shrink small outline package (SSOP), thin small outline package (TSOP), thin quad flat pack (TQFP), system in package (SIP), multi chip package (MCP), wafer-level fabricated package (WFP), wafer-level processed stack package (WSP), and so on.

Figure 26:
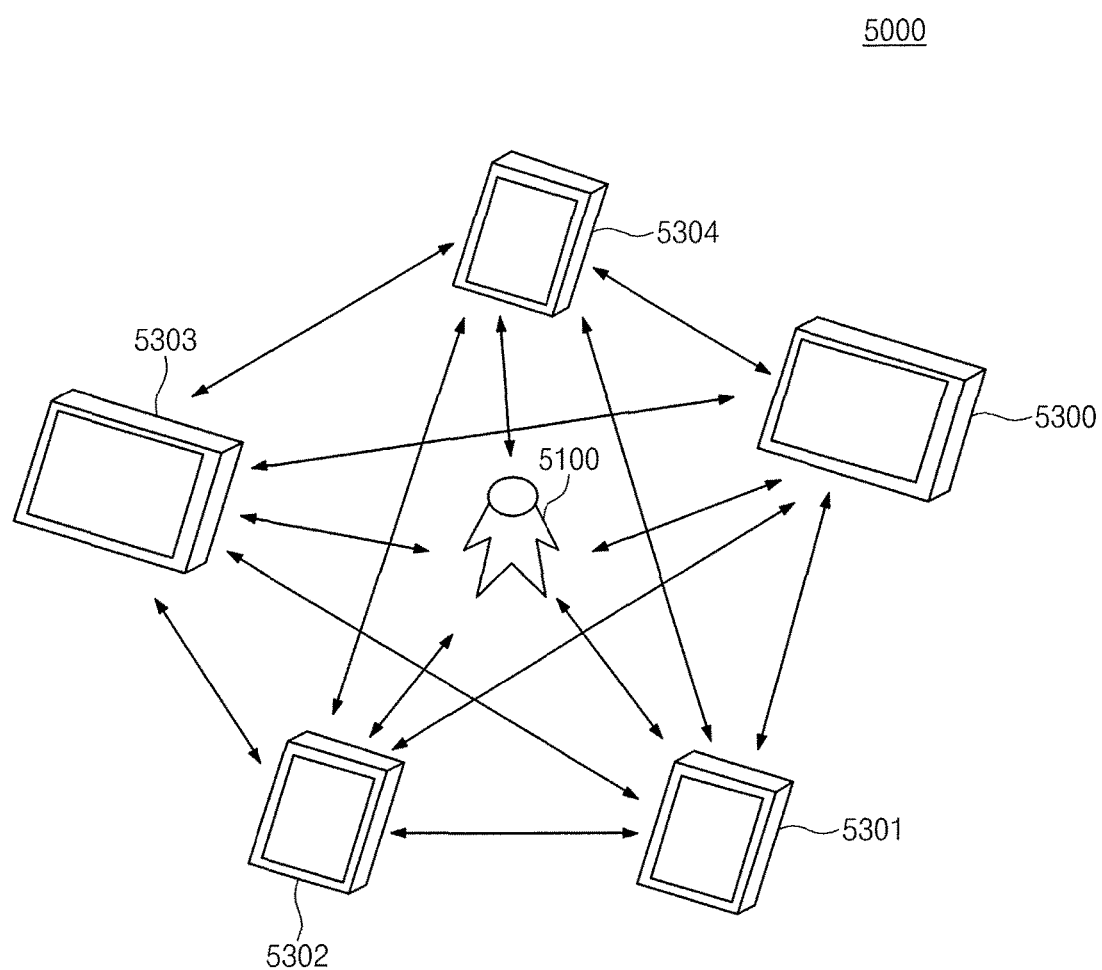
FIG. 26 is a diagram illustrating an "Internet of things (IoT)" system including a user and electronic devices implemented according to an exemplary embodiment of the present inventive concept.

FIG. 26 is a diagram illustrating an "internet of things (IoT)" system 5000 including a user 5100 and electronic devices 5300 to 5304 implemented according to an exemplary embodiment of the present inventive concept.

Each of the electronic devices 5300 to 5304 may be computer, a mobile terminal, a PDA, a PMP, a digital camera, a smart phone, a tablet, a wearable device, and so on. Each of the electronic devices 5300 to 5304 may be implemented according to an exemplary embodiment of the present inventive concept. Each of the electronic devices 5300 to 5304 may include a power transferring system 1000 (refer to FIGS. 21 and 22) operating according to a wireless power transferring operation. In other words, each of the electronic devices 5300 to 5304 may include a wireless charging system using resonance of inductive elements.

In an exemplary embodiment of the present inventive concept, a power management chip package 300 (refer to FIG. 15) included in each of the electronic devices 5300 to 5304 may include a voltage limiter 340 (refer to FIG. 15) for limiting a voltage corresponding to a control signal. In an exemplary embodiment of the present inventive concept, a power management chip package 400 (refer to FIG. 16) included in each of the electronic devices 5300 to 5304 may include an input current estimation circuit 470 (refer to FIG. 16) for estimating the intensity of an input current.

Each of the electronic devices 5300 to 5304 may exchange information with the user 5100. Each of the electronic devices 5300 to 5304 may exchange information with one another. The user 5100 and the electronic devices 5300 to 5304 may exchange information with one another through the "Internet".

A device configuration illustrated in each diagram is to help understanding of the present inventive concept. For example, each block may be formed of smaller blocks according to a function. Alternatively, a plurality of blocks may form a larger block according to a function. In other words, the present inventive concept is not limited to components illustrated in each diagram.

While the present inventive concept has been described with reference to exemplary embodiments thereof, it will be apparent to those skilled in the art that various changes and modifications may be made thereto without departing from the spirit and scope of the present inventive concept as defined by the following claims.

What is claimed is:

1. A direct current (DC)-DC converting circuit, comprising:
a voltage converter configured to receive an input voltage, to generate a regulation current in response to a driving signal, and to generate an output voltage and an output current, the output current being generated based on the regulation current;
an output voltage regulator configured to regulate the output voltage, and to output a first control signal through a control output terminal;
a voltage limiter configured to a voltage value of the first control signal below a threshold value, the voltage value of the first control signal being equal to a voltage value of a voltage of the control output terminal when the voltage of the control output terminal is equal to or smaller than a limiting reference voltage;
a current sensor configured to sense an intensity of the regulation current, and to generate a second control signal having a voltage value corresponding to a value of the sensed intensity; and
a driving signal generator configured to generate the driving signal based on the first and second control signals, the first control signal having the voltage value below the threshold value.

2. The DC-DC converting circuit of claim 1, wherein when a voltage value of the output voltage is equal to a voltage value regulated by the output voltage regulator or greater than a minimum critical value, the voltage value of the first control signal is equal to the voltage value of the voltage of the control output terminal, and
when the voltage value of the output voltage is below the voltage value regulated by the output voltage regulator and smaller than the minimum critical value, the voltage limiter is configured to limit the voltage value of the first control signal below the threshold value.

3. The DC-DC converting circuit of claim 1, Wherein the output voltage and the output current respectively correspond to a charging voltage and a charging current which are used to charge a battery that is not fully charged.

4. The DC-DC converting circuit of claim 3, wherein when the battery that is not fully charged is connected to a node configured to output the output voltage, the voltage limiter is configured to limit the voltage value of the first control signal below the threshold value.

5. The DC-DC converting circuit of claim 1, wherein the voltage limiter comprises:
an operational amplifier comprising a first input terminal configured to receive the limiting reference voltage, a second input terminal configured to receive the voltage of the control output terminal, and a comparison output terminal configured to output a result of comparing the limiting reference voltage and the voltage of the control output terminal; and
a diode, an anode of the diode being connected to the second input terminal, and a cathode of the diode being connected to the comparison output terminal.

6. The DC-DC converting circuit of claim 5, wherein a voltage value of the limiting reference voltage is adjustable.

7. The DC-DC converting circuit of claim 1, wherein when the voltage of the control output terminal is equal to or smaller than the limiting reference voltage, the voltage value of the first control signal is not influenced by the voltage limiter, and
when the voltage of the control output terminal is greater than the limiting reference voltage, the voltage limiter is configured to limit the voltage value of the first control signal below the threshold value.

8. A direct current (DC)-DC converting circuit, comprising:
a voltage converter configured to receive an input voltage, to generate a regulation current in response to a driving signal, and to output an output voltage and an output current, the regulation current comprising first current components of first intervals where a current value increases and second current components of second intervals where a current value decreases, the output current being generated based on the regulation current;
an output voltage regulator configured to regulate the output voltage, and to generate a first control signal through a control output terminal;
a voltage limiter configured to limit a voltage value of the first control signal below a threshold value, the voltage value of the first control signal being equal to a voltage value of a voltage of the control output terminal when the voltage of the control output terminal is equal to or smaller than a limiting reference voltage;
a current sensor configured to sense an intensity of the regulation current, and to generate a second control signal having a voltage value corresponding to a value of the sensed intensity;
an input current estimator configured to estimate an intensity of an input current by using the first current components of the first intervals, the input current being generated based on the input voltage; and
a driving signal generator configured to generate the driving signal based on the first and second control signals, the first control signal having the voltage value below the threshold value.

9. The DC-DC converting circuit of claim 8, wherein the voltage converter comprises:
a first transistor comprising a first terminal connected to a node configured to receive the input voltage, the first transistor being configured to be controlled by a first driving signal included in the driving signal;
a second transistor connected between a second terminal of the first transistor and a ground node, and configured to be controlled by a second driving signal included in the driving signal;
an inductive element, a first terminal of the inductive element being connected to the second terminal of the first transistor; and
a capacitive element connected between a node configured to output the output voltage and the ground node.

10. The DC-DC converting circuit of claim 9, wherein the first transistor and the second transistor are turned on in turn, in response to the first driving signal and the second driving signal, respectively.

11. The DC-DC converting circuit of claim 9, wherein the regulation current is a current flowing through the inductive element.

12. The DC-DC converting circuit of claim 8, wherein when the voltage of the control output terminal is equal to or smaller than the limiting reference voltage, the voltage value of the first control signal is not influenced by the voltage limiter, and
when the voltage of the control output terminal is greater than the limiting reference voltage, the voltage limiter is configured to limit the voltage value of the first control signal below the threshold value.

13. A power management chip package, comprising:
a rectifying circuit configured to rectify an alternating current (AC) voltage to generate a rectified voltage;
a direct current (DC)-DC converting circuit configured to receive the rectified voltage and to output an output voltage and an output current; and
a control circuit configured to control operations of the rectifying circuit and the DC-DC converting circuit,
wherein the DC-DC converting circuit comprises:
a voltage converter configured to receive the rectified voltage, to generate a regulation current in response to a driving signal, and to generate the output voltage and the output current, the output current being generated based on the regulation current;
an output voltage regulator configured to regulate the output voltage, and to output a first control signal through a control output terminal;
a voltage limiter configured to limit a voltage value of the first control signal below a threshold value, the voltage value of the first control signal being equal to a voltage value of a voltage of the control output terminal when the voltage of the control output terminal is equal to or smaller than a limiting reference voltage;
a current sensor configured to sense an intensity of the regulation current, and to generate a second control signal having a voltage value corresponding to a value of the sensed intensity; and
a driving signal generator configured to generate the driving signal based on the first and second control signals, the first control signal having a voltage value below the threshold value.

14. The power management chip package of claim 13, wherein when a voltage value of the output voltage is equal to a voltage value regulated by the output voltage regulator or greater than a minimum critical value, the voltage value of the first control signal is equal to the voltage value of the voltage of the control output terminal, and
when the voltage value of the output voltage is below the voltage value regulated by the output voltage regulator and smaller than the minimum critical value, the voltage limiter is configured to limit the voltage value of the first control signal below the threshold value.

15. The power management chip package of claim 13, wherein when the voltage of the control output terminal is equal to or smaller than the limiting reference voltage, the voltage value of the first control signal is not influenced by the voltage limiter, and
when the voltage of the control output terminal is greater than the limiting reference voltage, the voltage limiter is configured to limit the voltage value of the first control signal below the threshold value.

16. The power management chip package of claim 15, wherein the control circuit is configured to adjust a voltage value of the limiting reference voltage.

17. The power management chip package of claim 13, wherein the control circuit is configured to adjust a voltage value of a regulation reference voltage used to regulate the output voltage.

18. The power management chip package of claim 13, wherein the regulation current comprises first current components of first intervals where a current value increases and second current components of second intervals where a current value decreases, and wherein the power management chip package further comprises: an input current estimation circuit configured to estimate an intensity of an input current by using the first current components of the first intervals, the input current being generated based on the rectified voltage.

19. The power management chip package of claim 18, wherein the input current estimation circuit comprises:
a current component extractor configured to extract the first current components of the first interval from the regulation current in response to the driving signal; and
an estimation signal generator configured to generate an estimation signal based on the extracted first current components, the estimation signal comprising information corresponding to an estimated average intensity of the input current.

20. The power management chip package of claim 19, wherein the input current estimation circuit further comprises:
a scaler configured to adjust an amplitude of the estimated average intensity of the input current.

\* \* \* \* \*